(12) United States Patent
Staab et al.

(10) Patent No.: US 12,322,047 B2
(45) Date of Patent: *Jun. 3, 2025

(54) VISUAL DATA MANAGEMENT SYSTEM AND METHOD

(71) Applicant: DTIS, LLC, Nokesville, VA (US)

(72) Inventors: Sarah Nancy Staab, Washington, DC (US); Joseph Gerard Longo, Nokesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,339

(22) Filed: Nov. 28, 2023

(65) Prior Publication Data

US 2024/0096025 A1 Mar. 21, 2024

Related U.S. Application Data

(63) Continuation of application No. 17/582,588, filed on Jan. 24, 2022, now Pat. No. 11,875,461.

(Continued)

(51) Int. Cl.
*G06T 19/00* (2011.01)
*G06T 7/50* (2017.01)
(Continued)

(52) U.S. Cl.
CPC .............. *G06T 19/003* (2013.01); *G06T 7/50* (2017.01); *G06T 15/04* (2013.01); *G06V 20/20* (2022.01);
(Continued)

(58) Field of Classification Search
None
See application file for complete search history.

(56) References Cited

U.S. PATENT DOCUMENTS 852,834 A 5/1907 Gransden
8,519,909 B2 8/2013 Gomez et al.
(Continued)

FOREIGN PATENT DOCUMENTS

CN 109147053 A 1/2019
CN 110338852 A 10/2019
(Continued)

OTHER PUBLICATIONS

Jun. 21, 2022—(WO) International Search Report and Written Opinion—App. No. PCT/US2022/013487—19 pages.

*Primary Examiner* — Kent W Chang
*Assistant Examiner* — Jonathan M Cofino
(74) *Attorney, Agent, or Firm* — Darrell G. Mottley

(57) ABSTRACT

A system and method for creating, storing, interacting, and manipulating a digital facility is disclosed. One or more computing platform(s) may be configured to electronically receive a plurality of machine-readable sensor data of a physical facility having multiple 3D objects. One or more computing platform(s) may be configured to electronically process the plurality of machine-readable sensor data to output a machine-readable point cloud model configured for augmented virtual navigation. One or more computing platform(s) may be configured generate a machine-readable configuration database of geotagged-locations of the 3D objects. One or more computing platform(s) may be configured generate a machine-readable dynamic configuration database of 3D objects.

20 Claims, 17 Drawing Sheets

Related U.S. Application Data

(60) Provisional application No. 63/140,694, filed on Jan. 22, 2021.

(51) Int. Cl.
    *G06T 15/04*        (2011.01)
    *G06V 20/20*        (2022.01)

(52) U.S. Cl.
    CPC ...... *G06T 2200/04* (2013.01); *G06T 2200/08* (2013.01); *G06T 2207/10028* (2013.01); *G06T 2207/20084* (2013.01)

(56) References Cited

U.S. PATENT DOCUMENTS

| | | | |
|---|---|---|---|
| 11,080,702 B2 | 8/2021 | Sukhija et al. | |
| 11,127,203 B2 | 9/2021 | Gao | |
| 2011/0029897 A1* | 2/2011 | Russell | G05B 15/02 |
| | | | 715/757 |
| 2013/0073388 A1 | 3/2013 | Heath | |
| 2014/0279560 A1* | 9/2014 | Pedersoli | G06Q 20/3276 |
| | | | 705/64 |
| 2016/0025502 A1* | 1/2016 | Lacaze | G01S 19/51 |
| | | | 701/454 |
| 2018/0225861 A1* | 8/2018 | Petkov | G06T 15/08 |
| 2018/0293453 A1* | 10/2018 | Viswanathan | G06V 10/40 |
| 2019/0073827 A1 | 3/2019 | Coronado et al. | |
| 2019/0114830 A1* | 4/2019 | Bouazizi | G06F 3/013 |
| 2019/0291723 A1* | 9/2019 | Srivatsa | G05D 1/0221 |
| 2019/0325604 A1* | 10/2019 | Fink | G06T 19/006 |
| 2020/0302510 A1 | 9/2020 | Chachek et al. | |
| 2021/0065175 A1 | 3/2021 | Sukhija et al. | |
| 2021/0279969 A1 | 9/2021 | Cowburn et al. | |
| 2021/0319443 A1 | 10/2021 | Sukhija et al. | |

FOREIGN PATENT DOCUMENTS

| | | |
|---|---|---|
| CN | 111297501 A | 6/2020 |
| CN | 113574410 A | 10/2021 |
| EP | 2742431 A2 | 6/2014 |
| EP | 3335096 A1 | 6/2018 |
| EP | 2948227 B1 | 8/2018 |
| EP | 2817785 B1 | 5/2019 |
| EP | 3607465 A4 | 1/2021 |
| EP | 3797345 A1 | 3/2021 |
| EP | 3891527 A1 | 10/2021 |
| EP | 3909028 A1 | 11/2021 |
| ES | 2826552 A1 | 5/2021 |
| TW | M577975 U | 5/2019 |
| WO | 2013086475 A1 | 6/2013 |
| WO | 2018122709 A1 | 7/2018 |
| WO | 2020245654 A1 | 12/2020 |
| WO | 2021115980 A1 | 6/2021 |

\* cited by examiner

VISUAL DATA MANAGEMENT SYSTEM AND METHOD

CROSS REFERENCE TO RELATED APPLICATIONS

This Application is a Continuation of Application of U.S. application Ser. No. 17/582,588 filed on Jan. 24, 2022, which claims priority of U.S. Provisional Application 63/140,694 filed on Jan. 22, 2021. The entire contents of these applications are incorporated herein by reference in their entirety.

FIELD OF THE DISCLOSURE

The present disclosure pertains to a system and method for creating, storing, interacting, and manipulating a digital facility.

BACKGROUND

Traditionally, for a person to understand what a facility (i.e., building, structure, equipment, etc.) looks like they may attempt to access the physical facility to gain an understanding of the conditions of the physical facility.

As an example, when new equipment is planned to be installed several people may need to travel to the physical facility from various locations to survey the current conditions of the facility. This onsite survey often involves one or two people that need to be involved in the whole survey of the facility and several other people who will only need to see a small fraction of the survey. Often during the survey process data is collected manually. As examples this manual data collection may involve a writing utensil and paper, inspections, and tape measures. If a person determines that they neglected to collect an important detail during the initial survey, people often will need to go back to the physical facility to collect the missing data. Other times to verify a measurement that was taken manually during the survey, this too often requires travel back to the physical facility.

As another example, when technicians are working on equipment in a physical facility, they may want support to help understand why their equipment is not operating as intended. This too often requires someone who is remote to travel to the facility to see the conditions of the physical facility and equipment. Travel to and from a remote location to the physical facility is inefficient.

SUMMARY

The present disclosure generally pertains to a system and method for creating, storing, interacting, and manipulating a digital facility. The digital facility is particularly well suited for documenting the current conditions of a physical facility and future plans for a physical facility.

In one aspect of the disclosure, electronic sensor(s) in conjunction with programmable logic is used to create a computerized model of a physical facility, also known as a digital facility. As examples, the electronic sensor(s) may be a camera, a laser, an ultrasonic sensor, or another distance measuring sensor. In one aspect of the disclosure the electronic sensor(s) is a laser. In another aspect of the disclosure, the electronic sensor(s) is a camera, and the camera is chosen from a group consisting of 2D cameras, 3D cameras, and infrared cameras. In another aspect of the disclosure, the electronic sensors are a combination of lasers and cameras.

In another aspect of the disclosure, multiple electronic sensors are used to create the digital facility. In one aspect of the disclosure users can view the digital facility as it is being generated. In another aspect of the disclosure users can see both the physical facility and the digital facility as the digital facility is being generated.

In one aspect of the disclosure, the system may include one or more hardware processors configured by machine-readable instructions. In an aspect, the machine-readable instructions include electronically receiving a plurality of machine-readable sensor data of a physical facility having multiple 3D objects. In an aspect, the machine-readable instructions include electronically processing the plurality of machine-readable sensor data to output a machine-readable point cloud model configured for augmented virtual navigation by a remote user platform. In an aspect, the machine-readable instructions include electronically processing machine-readable point cloud model to generate a machine-readable configuration database of geotagged-locations of the 3D objects.

In an aspect, the machine-readable instructions include electronically processing the plurality of machine-readable sensor data to output a machine-readable point cloud model configured for augmented virtual navigation by a remote user. In an aspect, the machine-readable instructions include electronically processing the point cloud model with a neural network to output a set of probable suggestions for augmented virtual navigation of the point cloud model by remote user. In an aspect, the machine-readable instructions include a deep learning neural network.

In another aspect of the disclosure, the electronic sensor(s) are movable. As examples the electronic sensor may be attached or moved by a user, be controlled remotely, or may be autonomous.

In another aspect of the disclosure, the electronic sensor(s) may be integrated into the facility. As examples, the electronic sensor(s) may be attached or integrated into the walls, the ceiling, the lighting, or other equipment in the facility.

In another aspect of the disclosure, the digital facility is stored on an electronic device. As examples, the electronic device may be a hard drive such as a Parallel Advanced Technology Attachment (PATA), a Serial Advanced Technology Attachment, a Small Computer System Interface (SCSI), or a Solid-State Drive (SSD), or another method for storing digital data.

In another aspect of the disclosure, the digital facility can be stored on an electronic device in one location and accessed by an electronic device in a separate location, also known as "remote." As examples, the digital facility may be accessed via the internet, intranet, wireless network, BLUETOOTH®, or another method of remote connection. In one aspect of the disclosure, the digital facility is accessed via the internet. In another aspect of the disclosure, the digital facility is accessed via intranet.

In another aspect of the disclosure, the digital facility is protected via security. As examples, the security may be physical security or digital security including accessibility to the digital facility. In one aspect of the disclosure, digital security is used to protect who can access the digital facility.

In another aspect of the disclosure, users can navigate through the digital facility. As examples, users can navigate through the digital facility using their own electronic device, can receive a guided walkthrough on their electronic device from another user, view a pre-recorded walkthrough on their electronic device, or can participate in a collaborative walk-through with multiple users on multiple electronic devices.

In another aspect of the disclosure, users can determine the availability of other users to determine the availability of multiple users to host collaborative walkthroughs of the digital facility. In one aspect of the disclosure, the ability to determine users' availability is accomplished via a search of user calendars to see who is available. In another aspect of the disclosure, the ability to determine users' availability is accomplished via a search to see who is actively using an electronic device that has the ability to connect to the scheduler's electronic device.

In another aspect of the disclosure, users can schedule a collaborative walkthrough of the digital facility.

In another aspect of the disclosure, users can view relevant details about the digital facility. As examples, the user may be able to view, mark, and annotate interconnections with other components in the digital facility, maintenance manuals related to equipment within the digital facility, space reserved for equipment to be installed in the facility, measurements related to the digital facility or components within the digital facility, or notes from other users.

In another aspect of the disclosure, the programable logic and the electronic sensor(s) detect an element of a component in the physical facility and mark or highlight information related to the element to the user. The element may be, for example, a 2D or 3D image of the component, an RFID, barcode, serial number, or a Quick Response (QR) Code. In one aspect of the disclosure, the element is a barcode. In another aspect of the disclosure, the element is a serial number. In another aspect of the disclosure the element is an image of the component.

In another aspect of the disclosure, the programable logic contains artificial intelligence. In one aspect of the disclosure, the artificial intelligence recognizes components in a database. In another aspect of the disclosure, the artificial intelligence recognizes new components and recommends data related to the new component be added to a database. In another aspect of the disclosure, the artificial intelligence highlights suggestions to the user based on the user's history or profile. In another aspect of the disclosure, the artificial intelligence highlights suggestions to the user based on the user's current location in the digital facility or physical facility.

In another aspect of the disclosure, the programable logic and electronic sensor(s) references one or more databases. In one aspect of the disclosure the programable logic and electronic sensor(s) have the ability to reference both databases on an electronic device that stores the programable logic as well as databases that are on remote electronic devices. In one aspect of the disclosure, the programable logic references a database and determines what software should be installed on the component to help maintain configuration management of the facility. In another aspect of the disclosure, the programable logic references the database to determine how many spare components are in stock. In another aspect of the disclosure, the programable logic references the database to determine when new software for the component will be available.

In another aspect of the disclosure, the programable logic references the database to determine the history of the component. In another aspect of the disclosure, the programable logic references the database to determine other compatible components. In another aspect of the disclosure, the programable logic references the database to determine component connection diagrams. In another aspect of the disclosure, the programable logic references the database to determine common troubleshooting steps. In another aspect of the disclosure, the programable logic references the database to determine the history of component failures. In another aspect of the disclosure, the programable logic references the database to determine previous component setting changes. In another aspect of the disclosure, the programable logic references the database to determine user manuals, maintenance handbooks, support videos, or training material for the component In another aspect of the disclosure, programable logic is used to add information to a database captured by the user or the electronic sensor(s). In one aspect of the disclosure, the programable logic updates the configuration management of the facility. In another aspect of the disclosure, the programable logic documents time spent working on the component. In another aspect of the disclosure, the programable logic tracks component troubleshooting steps. In another aspect of the disclosure, the programable logic performs audits of components captured in the facility with the electronic sensor (s) versus what components should be in the facility. In another aspect of the disclosure, the programable logic documents the location of the component (e.g., Geotagging, facility call sign, etc.). In another aspect of the disclosure, the programable logic logs audio and/or visual data related to the components.

In another aspect of the disclosure, programable logic automatically fill out forms related to the component seen with the electronic sensor(s).

In another aspect of the disclosure, the programable logic responds to audio, hand, or eye commands from a user.

In another aspect of the disclosure, users can utilize the digital facility to maintain configuration management of the physical facility.

In another aspect of the disclosure, users can add or remove components from the digital facility. In one aspect of the disclosure, the users can add components that are not currently in the physical facility. As examples, the user may add new equipment or new furniture. In another aspect of the disclosure, the user can remove components or unwanted objects from the digital facility. As examples, the user may remove people or equipment from the digital facility.

In another aspect of the disclosure, users can use the digital facility to provide remote support to people who are in the physical facility. Users can navigate to the location in the digital facility that the person is in the physical facility. As examples, the remote user can provide remote maintenance support of equipment in the physical facility, can determine interconnections and potential trouble spots, and provide visual audits of equipment within the digital facility.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various implementations, reference is made to the accompanying drawings, which form a part hereof, and in which is shown by way of illustration, various implementations in which the disclosure may be practiced. It is to be understood that other implementations may be utilized and structural and functional modifications may be made.

Figure 12:
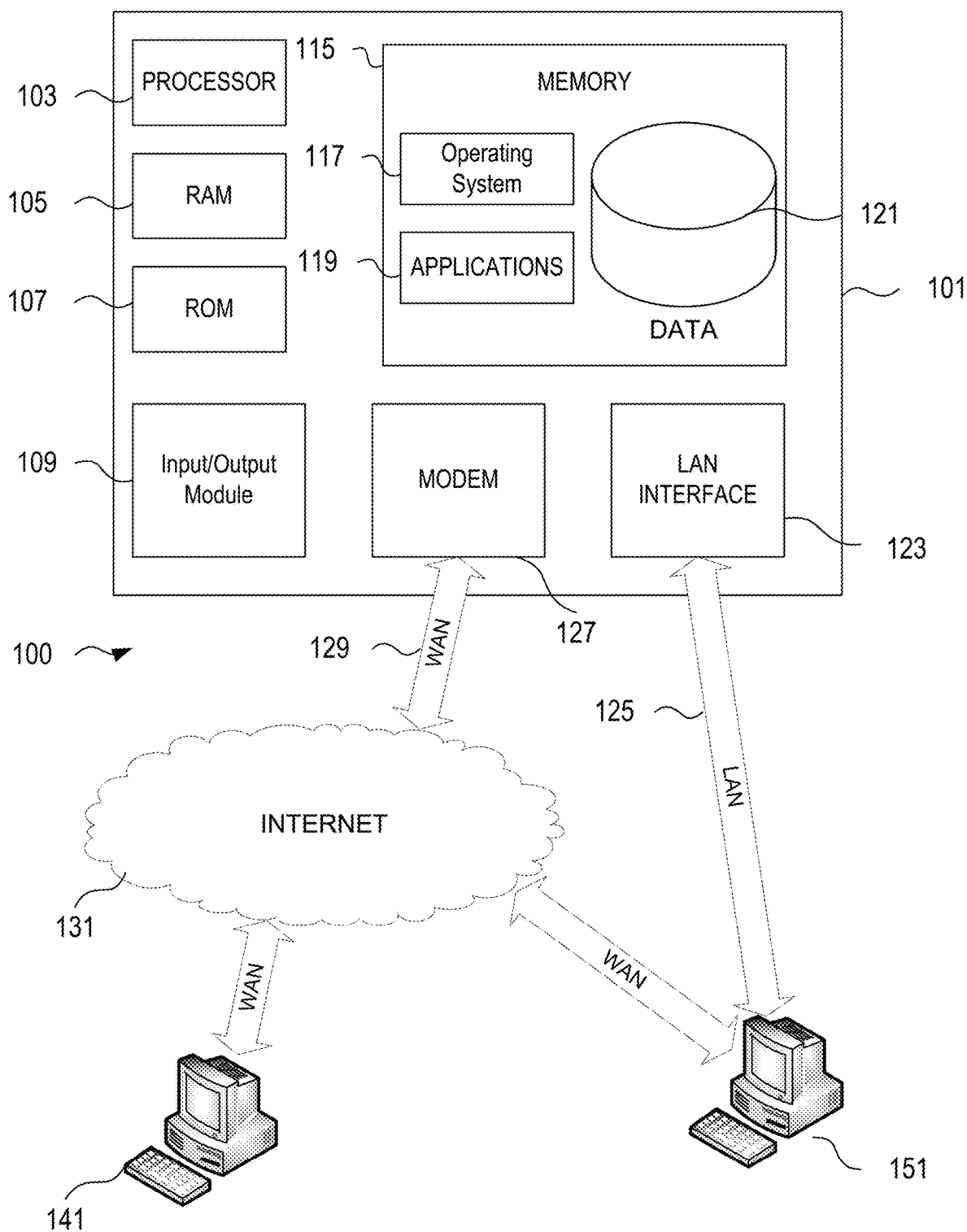
FIG. 12 illustrates a schematic diagram of a digital computing environment in which certain aspects of the present disclosure may be implemented.
Figure 15:
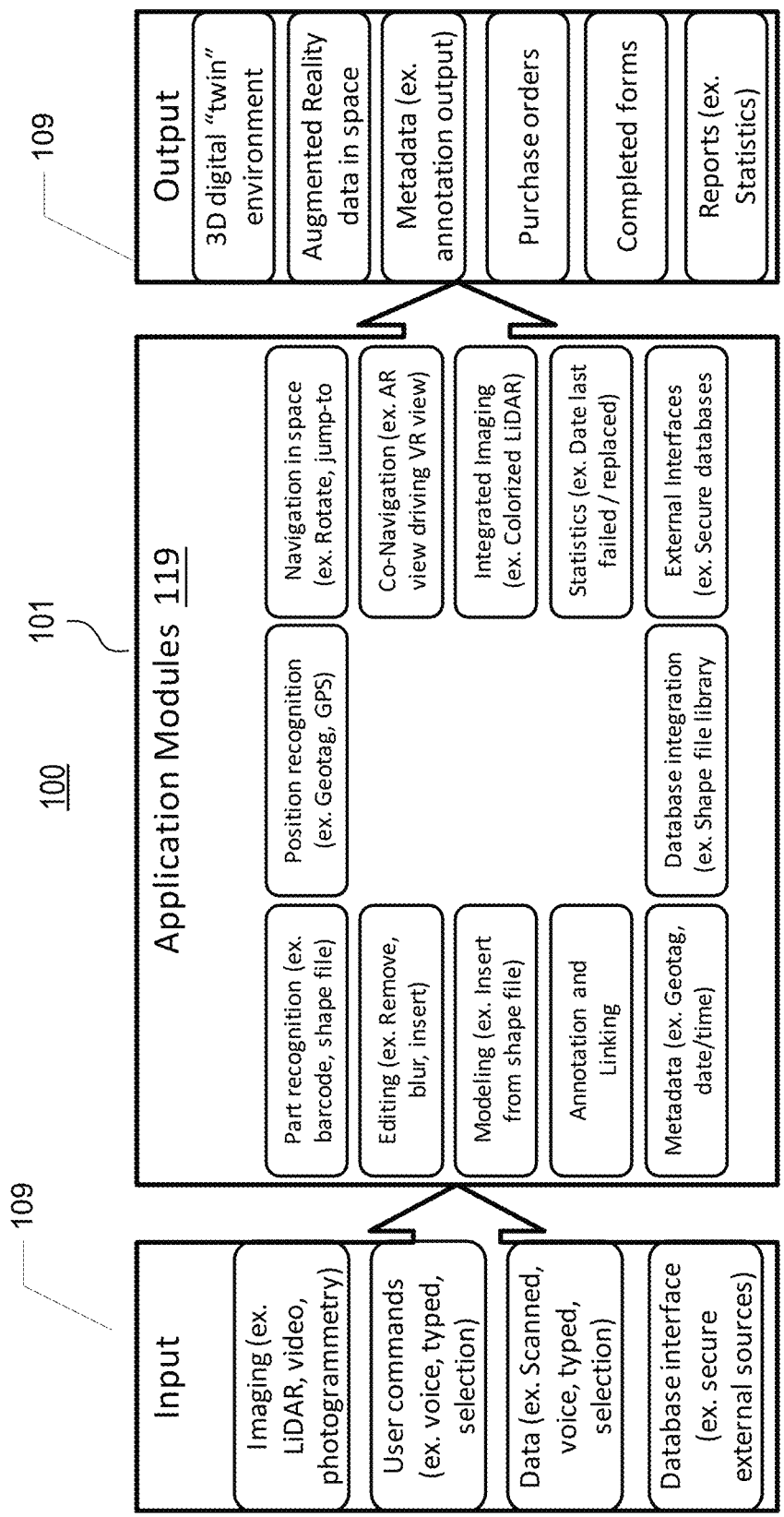
FIG. 15 is an illustrative functional block diagram of a neural network that may be used to implement the processes and functions, in accordance with one or more implementations of the present disclosure.

The disclosure may be described in the context of computer-executable instructions, such as program logic modules 119, being executed by a computer 101 as shown in FIGS. 12 and 15. FIG. 15 illustrates a computer system 100 in accordance with one or more implementations of the present disclosure. In some implementations, system 100 may include one or more computing platforms. Computing platform(s) may be configured to communicate with one or more remote platforms 201 according to a client/server architecture, a peer-to-peer architecture, and/or other architectures. Remote platform(s) 201 may be configured to communicate with other remote platforms via computing platform(s) and/or according to a client/server architecture, a peer-to-peer architecture, and/or other architectures. Users may access system 100 via remote platform(s) 201 (see FIGS. 12 and 13). Computing platform(s) may be configured by machine-readable instructions. Machine-readable instructions may include one or more instruction modules. The instruction modules may include computer program logic modules 119 shown in FIG. 15.

Generally, program logic modules 119 include routines, programs, objects, components, data structures, etc. that perform particular tasks or implement particular computer data types. The disclosure may also be practiced in distributed computing environments where tasks are performed by remote processing devices that are linked 202 through a communications network 203, for example. In a distributed computing environment, program logic modules may be located in both local and remote computer storage media including memory storage devices (see FIG. 13).

Figure 1:
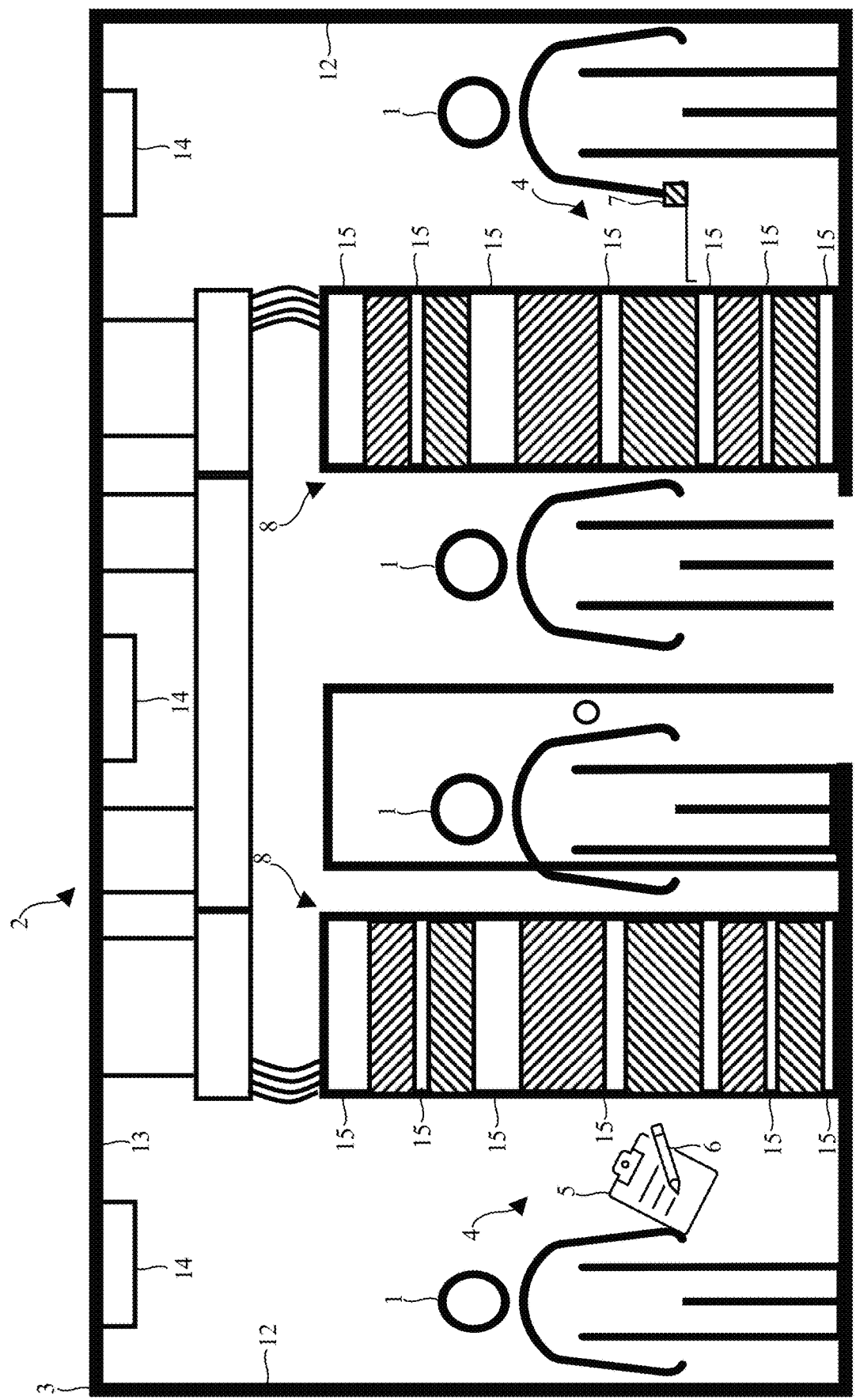
FIG. 1 is a side elevation view of a survey of equipment and components within a facility.

In one use case, when new equipment needs to be installed several people 1 may need to travel to the physical facility 3 from various locations to survey the current conditions of the facility 2 (see FIG. 1). This onsite survey often involves one or two people 1 that need to be involved in the whole survey of the facility 2 and several other people 1 who will only need to see a small fraction of the survey. Often during the survey process data is collected manually 4. As examples this manual data collection may involve writing utensil 5 and paper 6, visual inspections, and tape measures 7. If a person 1 determines that they neglected to collect an important detail during the initial survey, people 1 often will need to go back to the physical facility 3 to collect the missing data. Other times it will be necessary to verify a measurement that was taken manually 4 during the survey, this too often requires travel back to the physical facility 3.

As another example, when technicians are working on equipment in a physical facility 3, they may need support to help understand why their equipment 8 is not operating as intended. This too often requires someone who is remote to travel to the facility 2 to see the conditions of the physical facility 3 and equipment 8.

Travel to and from a remote location to the physical facility 3 is inefficient. Certain aspects, enable people 1 to see the conditions of the facility 2 without having to travel to the physical facility 3, this time can be saved, and the remote support can spend more time helping those in the field without spending time traveling to various facilities 2. In addition, there is be a cost savings of not needing to pay for travel to the physical facility 3.

Figure 2:
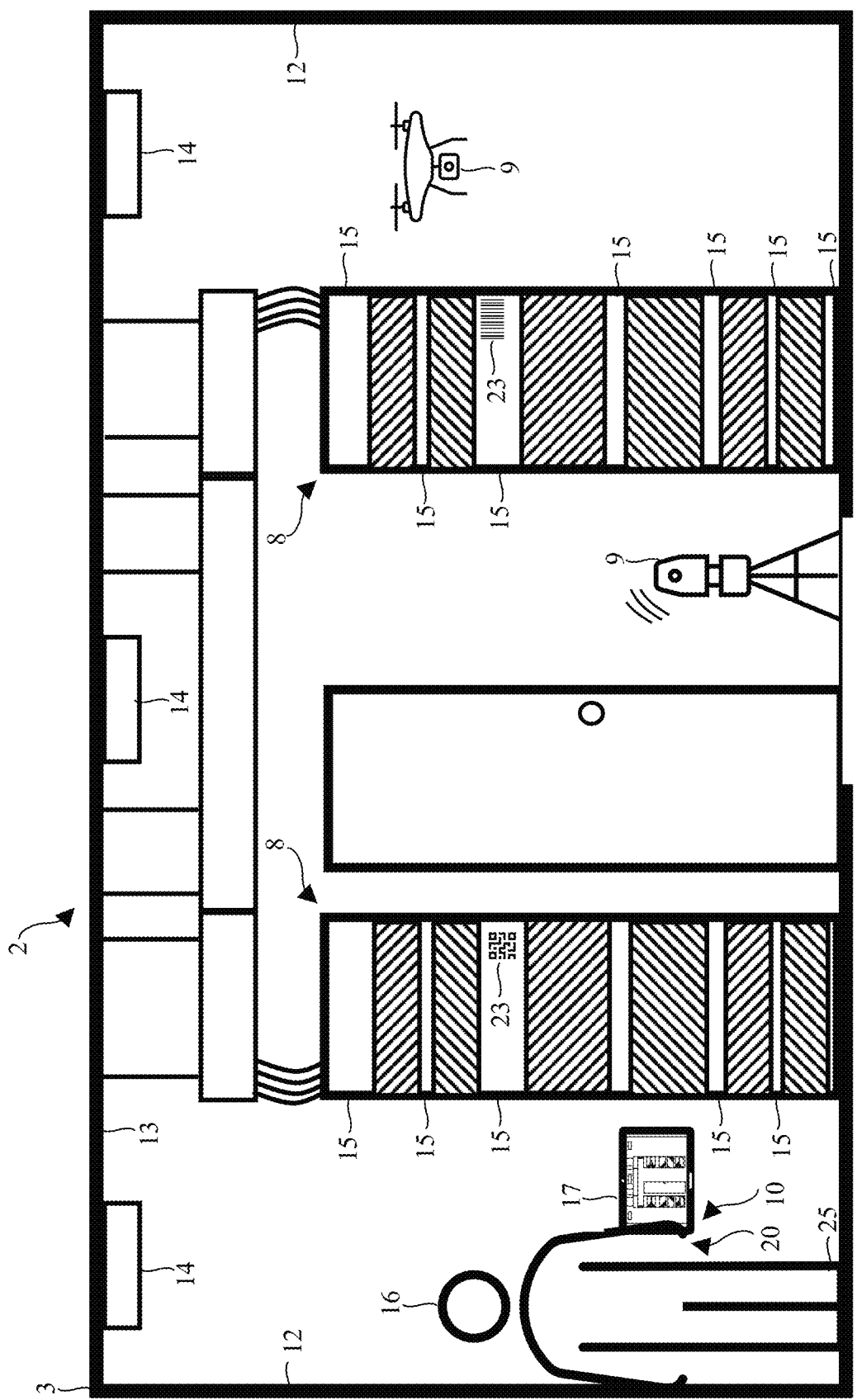
FIG. 2 is a side elevation view showing movable sensors capturing data related to a facility.
Figure 3:
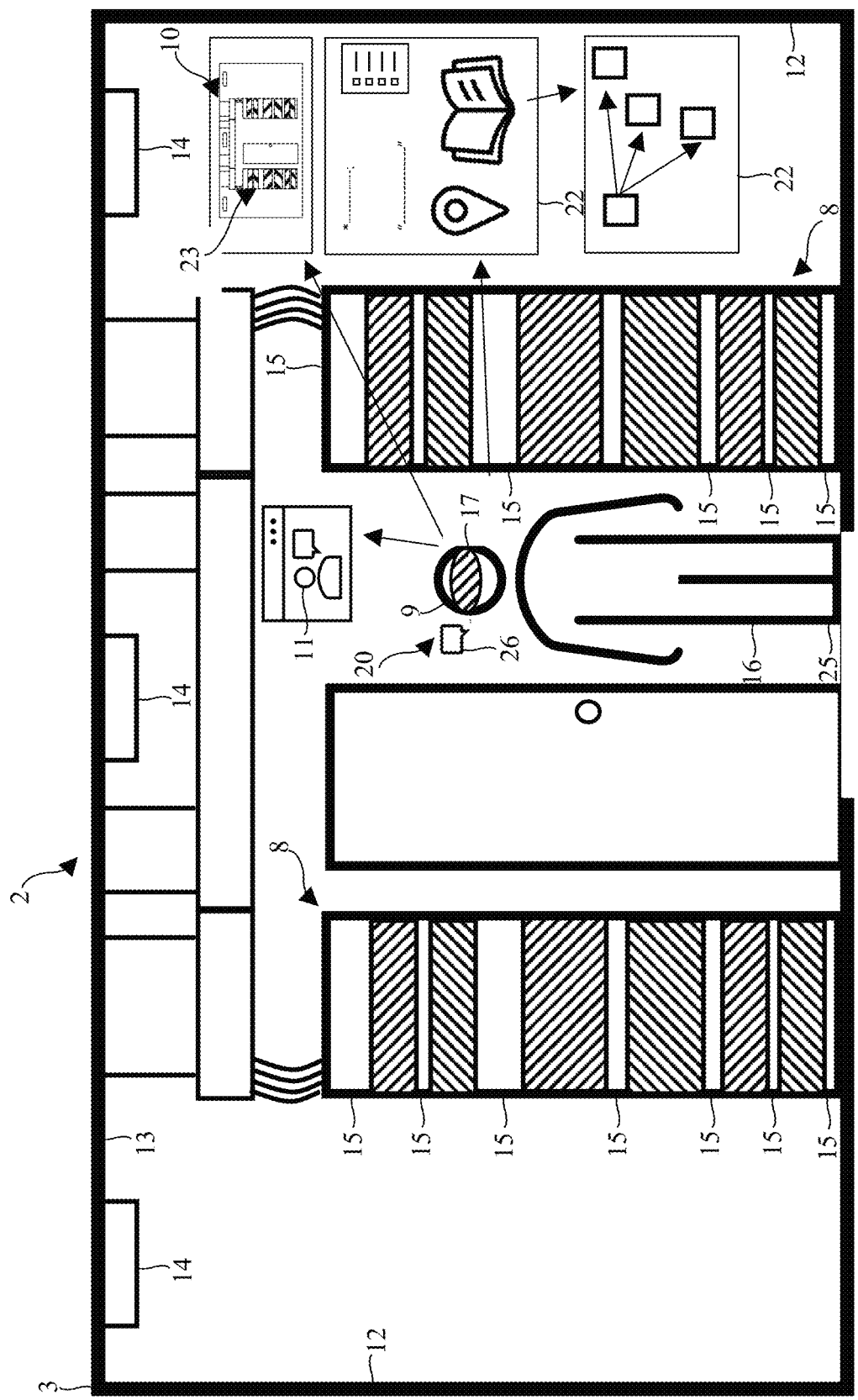
FIG. 3 is a side elevation view of a wearable sensor capturing data related to a facility.
Figure 4:
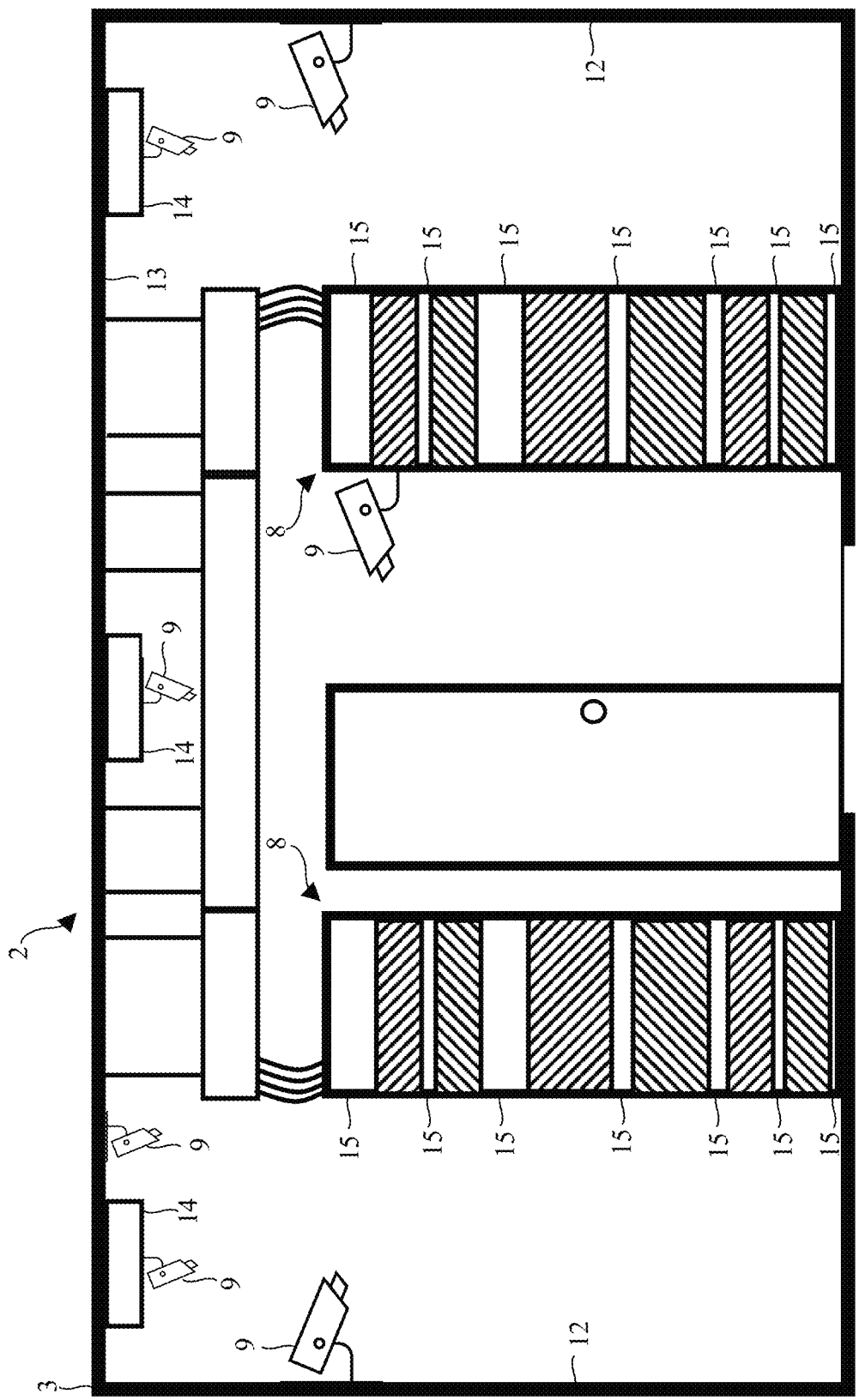
FIG. 4 is a side elevation view of permanent or semi-permanent sensors capturing data related to a facility.

In accordance with aspects referring to FIGS. 2-4, in one or more technological improvements, one or more electronic sensor(s) 9 in conjunction with programmable logic 119 is used to create a digital computerized point cloud model or digital representation of a physical facility 3, defined herein as a digital facility 10. This enables the remote user 11 to see a virtual representation of the physical facility 3 and in some cases may eliminate travel to the physical facility 3. The physical facility 3 may have walls, ceilings, roofing, frames, and equipment and components, including surfaces, shades, and colors. The digital facility 3 may include including physically based rendering (PBR) textures of walls, ceilings, roofing, frames, and equipment and components. In some implementations, the electronic sensor 9 may be a camera, a laser (LiDAR), or an ultrasonic sensor which provide machine readable input data to system 100 received by input/output module 109 shown in FIGS. 12 and 15. In some implementations, the electronic sensor 9 may be another distance measuring sensor. In some implementations, the electronic sensor 9 is a combination of lasers and cameras. In some implementations, multiple electronic sensors 9 are used to create the digital facility 10 (see FIGS. 2 and 4).

In some implementations, multiple electronic sensors 9 at multiple vantage points contribute information to generate the digital facility 10. In some implementations, crowdsourcing multiple users 16 with multiple electronic sensors 9 are used to generate the digital facility 10. In some implementations, multiple electronic sensors 9 contribute information at separate points in time to generate the digital facility 10. Allowing multiple users 16 to contribute to the digital facility 10 allows the digital facility to have the most up-to-date conditions as the physical facility 3 changes over time. In some implementations, electronic sensor(s) 9 are used to only capture a portion of the physical facility 3 to update a portion of the digital facility 10. Preferably, updating portions of the digital facility 10 that have changed decreases the time needed to generate the digital facility 10 as changes to the physical facility 3 occur. The electronic sensor(s) 9 and programmable logic 119 create a digital representation of the physical facility 3 that can be shared with other users. The electronic sensor(s) 9 and the programmable logic 119 may be combined in the same unit or may be separate entities. The electronic sensor(s) 9 is placed near or within the physical facility 3 in such a way as to collect data relevant to being able to portray the conditions of the physical facility 3 that are of interest. (see FIG. 15). Referring to FIGS. 2 and 3, in some implementations, the electronic sensor(s) 9 can be moved from one location to another location to collect the data needed for the programable logic 119 to create the digital facility 10. In some implementations, the electronic sensor(s) 9 may be attached to a user, be moved by a user, be controlled remotely, or may be autonomous. In some implementations, the electronic sensor(s) 9 are worn by a user. An electronic sensor(s) 9 that can be moved from one location to another allows for the electronic sensor(s) 9 to be used in multiple physical facilities 3.

In some implementations, the electronic sensor(s) 9 is worn by a user(s). In some implementations, the electronic sensor(s) 9 may be a permanent or semi-permanent fixture within the physical facility 3 (see FIG. 4). Having the electronic sensor(s) 9 be a permanent or semi-permanent fixture within the physical facility 3 may ensure that anytime there are changes to the facility 2 the data needed to generate the digital facility 10 is collected from the same location or vantage point. In some implementations, the electronic sensor 9 may be attached or integrated into the walls 12, the ceiling 13, the lighting 14, or other equipment 8 or components 15 in the facility. In some implementations, users 16 can share the data from the electronic sensor 9 and the programable logic 119 with remote users 11 as the digital facility 10 is being generated. In some implementations, users 11 and 16 can see the physical facility 3 and the digital facility 10 as the digital facility 10 is being generated. The ability to share the digital facility 10 as it is being generated (see FIG. 3) allows, for example, remote users 11 to perform audits, troubleshoot equipment 8 and/or components 15, provide technical support for equipment 8 and/or components 15, provide equipment 8 and/or component 15 training, familiarize users with equipment 8 and/or components 15, and manage version control of equipment 8 and/or components 15 within the facility 2. In addition, the remote user 11 may be able to see what a user 16 at the physical facility 3 is seeing. In some implementations, the remote user 11 may identify other areas that they need captured in the digital facility 10 as it is being captured.

Figure 5:
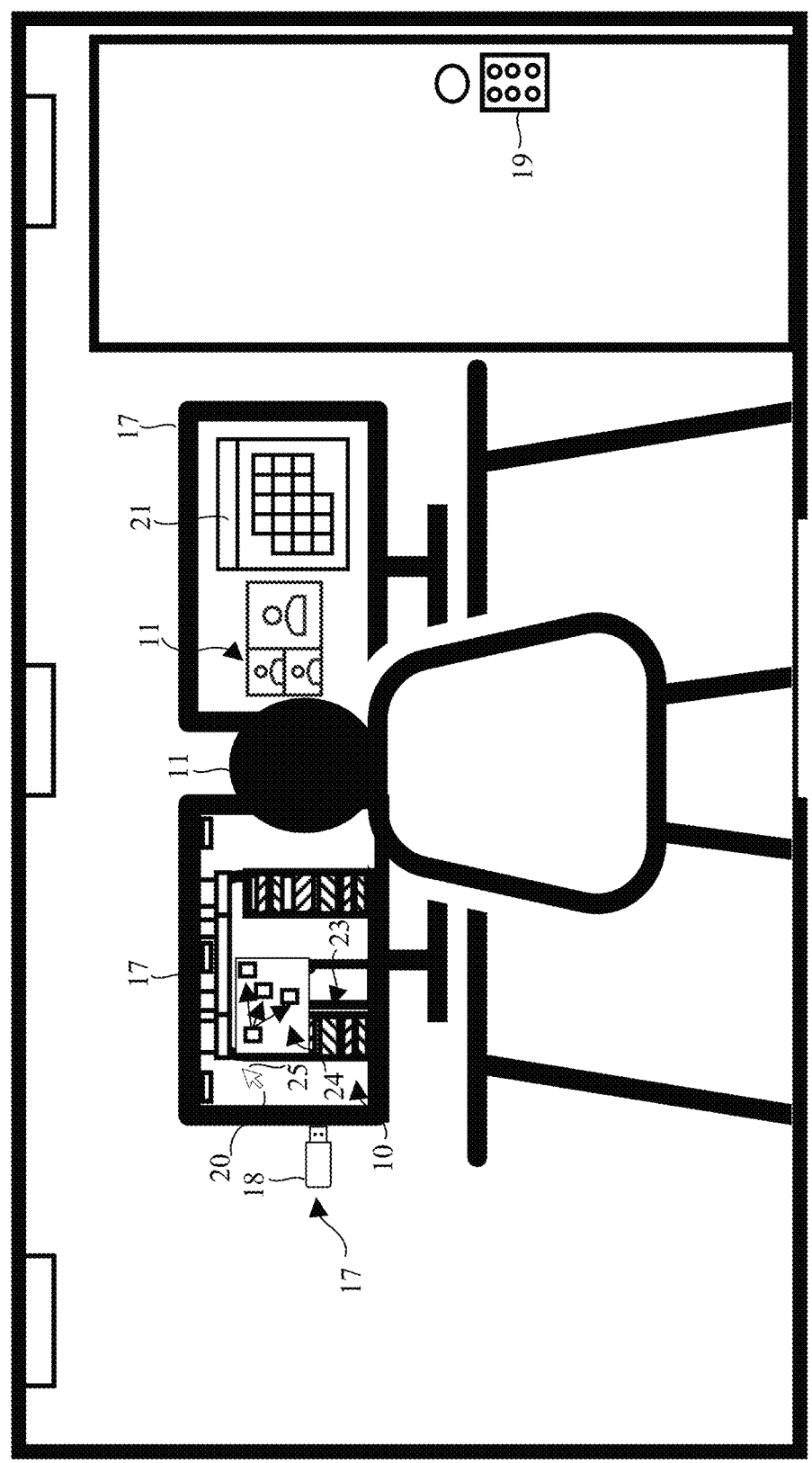
FIG. 5 is a front view of a remote user manipulating a digital copy of a physical facility.

Once the electronic sensor 9 and programable logic 119 have created the digital facility 10, the digital facility 10 may be stored on an electronic device 17 (see FIGS. 2, 3 and 5). In some implementations, the electronic device 17 may be a hard drive 18 such as a Parallel Advanced Technology Attachment (PATA), a Serial Advanced Technology Attachment, a Small Computer System Interface (SCSI), or a Solid State Drive (SSD). Other methods for storing the data of the digital facility 10 may also be used. Saving the digital facility 10 to an electronic device 17 allows users 16 and remote users 11 to go back and look at the digital facility 10 without having to recollect the data needed to create the digital facility 10. In addition, it allows users 16 and remote users 11 to further manipulate the digital facility 10. In one implementation, the electronic device 17 that stores the digital facility 10 is in a separate location than the remote user 11 that is accessing the digital facility 10, also defined as "remote." The ability to access the digital facility 10 remotely allows remote users 11 from various locations to view and manipulate the data of the digital facility 10. In one implementation, the digital facility 10 may be accessed via the Internet. In other implementations, the digital facility 10 may be accessed via an intranet, a wireless network, a BLUE-TOOTH® connection, or another method of remote connection.

Because the digital facility 10 may contain information that is sensitive, there may be a need to have security 19 to protect the data that makes up the digital facility (see FIG. 5). In one implementation, the security 19 is a physical barrier that inhibits users from being able to physically get to the location the digital facility 10 is stored. In another implementation, software may be used as security 19 to digitally protect who can gain access to the digital facility 10 or who can view and gain access to certain parts of the digital facility 10. This may include the ability to set permissions for users 16 and remote users 11. In some implementations, permissions can be set for a group of users 16 and remote users 11. Allowing individual permissions for users 16 and remote users 11 or groups of users 16 and remote users 11 allows the visibility of the digital facility 10 or portions of the digital facility 10 to be flexible on a need-to-know basis. In another implementation, the security 19 contains both physical and digital means to protect who can gain access to the digital facility 10.

Users 16 and remote users 11 may have a desire to see multiple equipment 8 and/or components 15 in the digital facility 10 and have a desire to navigate 20 through the digital facility 10 (see FIGS. 2, 3, and 5). In some implementations, users 16 and remote users 11 who are viewing the digital facility 10 can navigate 20 through the digital facility 10 or call up details of the digital facility 10 on an electronic device 17 to see equipment 8 and/or components 15 and areas of interest. The user 16 and/or remote user 11 may use a keyboard, mouse, voice, hand, fingers, head or eyes to navigate 20 or call up details in the digital facility 10. Other ways a user may navigate 20 or call up details in the digital facility 10 are also possible. In some implementations, the remote user 11 and/or user 16 is able to see how the user 16 and/or remote user 11 is navigating through the digital facility 10 and the documentation 22 of the digital facility 10 that are being called up by the user 16 and/or remote user 11. In some implementations, remote users 11 receive a walk through from a user 16 or another remote user 11 who is navigating 20 through the digital facility 10 on an electronic device 17. In other implementations, a user 16 or remote user 11 may view a pre-recorded walkthrough of the digital facility 10 on an electronic device 17. In other implementations, users 16 and/or remote users 11 participate in a collaborative walkthrough (FIG. 5) of the digital facility 10 on various electronic devices 17 with multiple users 11 and 16 in various locations. In some implementations, the collaborative walkthrough occurs with the user 16 using an augmented reality device to interact with the digital facility 10 and the remote user 11 using virtual reality to interact with the digital facility 10. In some implementations the electronic device 17 contains the programable logic and the electronic sensor 9 needed to create the digital facility 10. In other implementations, the electronic device 17 may separate from the electronic sensor 9 and the programable logic needed to create the digital facility 10.

If users 16 and remote users 11 want to hold a collaborative walkthrough of the facility 2 it may be necessary to determine when the various users 11 and 16 are available to support a walkthrough of the facility 2 (see FIG. 5). In some implementations, an electronic device 17 is used to determine the availability of multiple users 11 and 16 from multiple organizations or companies. In some implementations, the electronic device 17 used to determine the availability of the users 11 and 16 is the same electronic device 17 used to share the digital facility 10 with other users 11 and 16. In some implementations, the electronic device 17 used to determine the availability of the users 11 and 16 is a separate electronic device 17 than the electronic device 17 used to share the digital facility 10 with other users 11 and 16. In some implementations, the ability to determine users' 11 and 16 availability is accomplished via a search of users' 11 and 16 electronic calendars 21 to see who is available. In other implementations, the ability to determine users' 11 and 16 availability is accomplished via a search to see who is actively using an electronic device 17 that has the ability to connect to the scheduler's electronic device 17. Once the availability of the users 11 and 16 is determined using the electronic device 17 it may be helpful to schedule the walkthrough and place a reminder in the electronic calendars 21 of the users 11 and 16. In some implementations, the electronic device 17 can determine the availability of the users and place a reminder in the electronic calendars 21 of the users 11 and 16.

Figure 6:
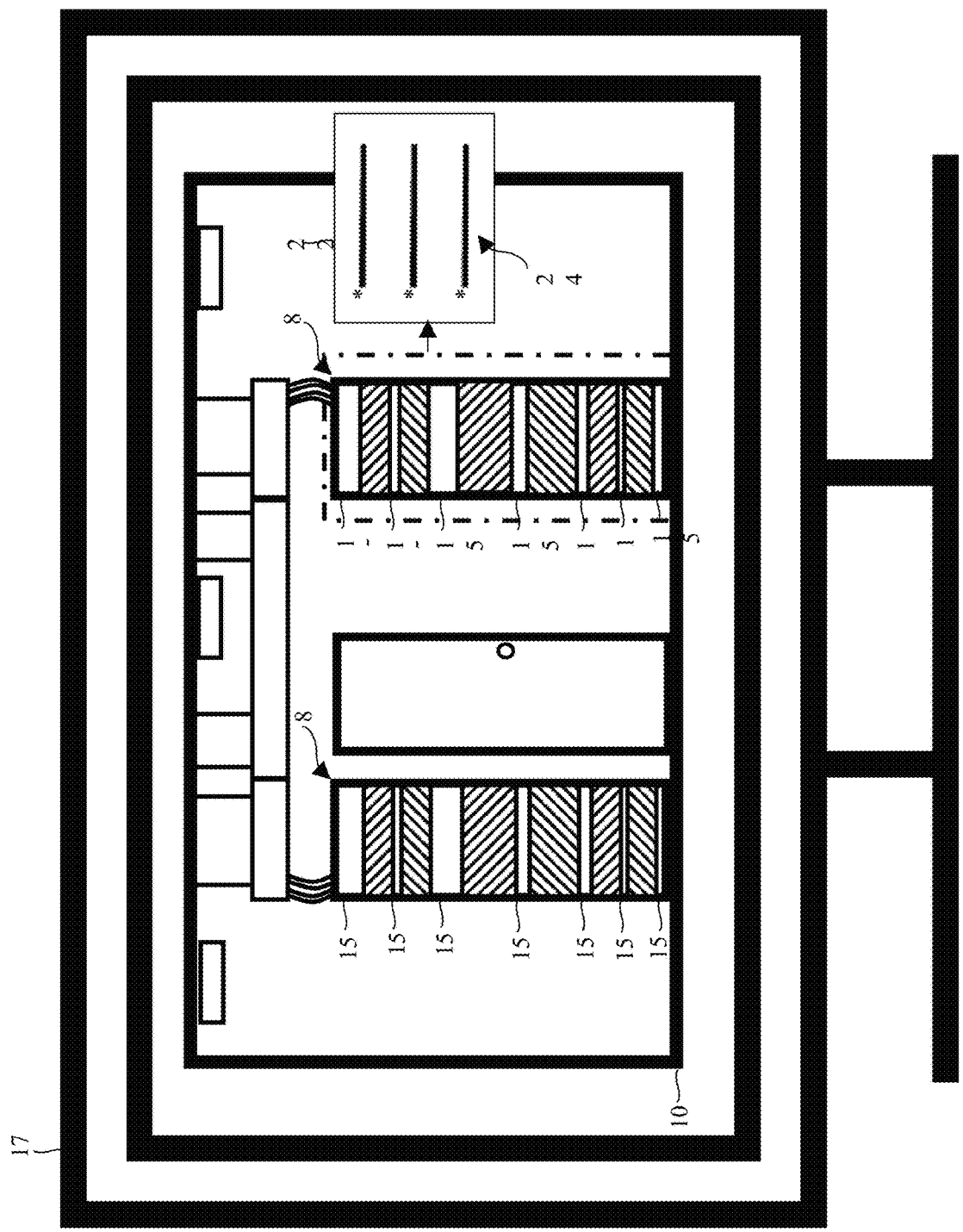
FIG. 6 is a front view of a digital copy of a physical facility being marked up on an electronic device.
Figure 10:
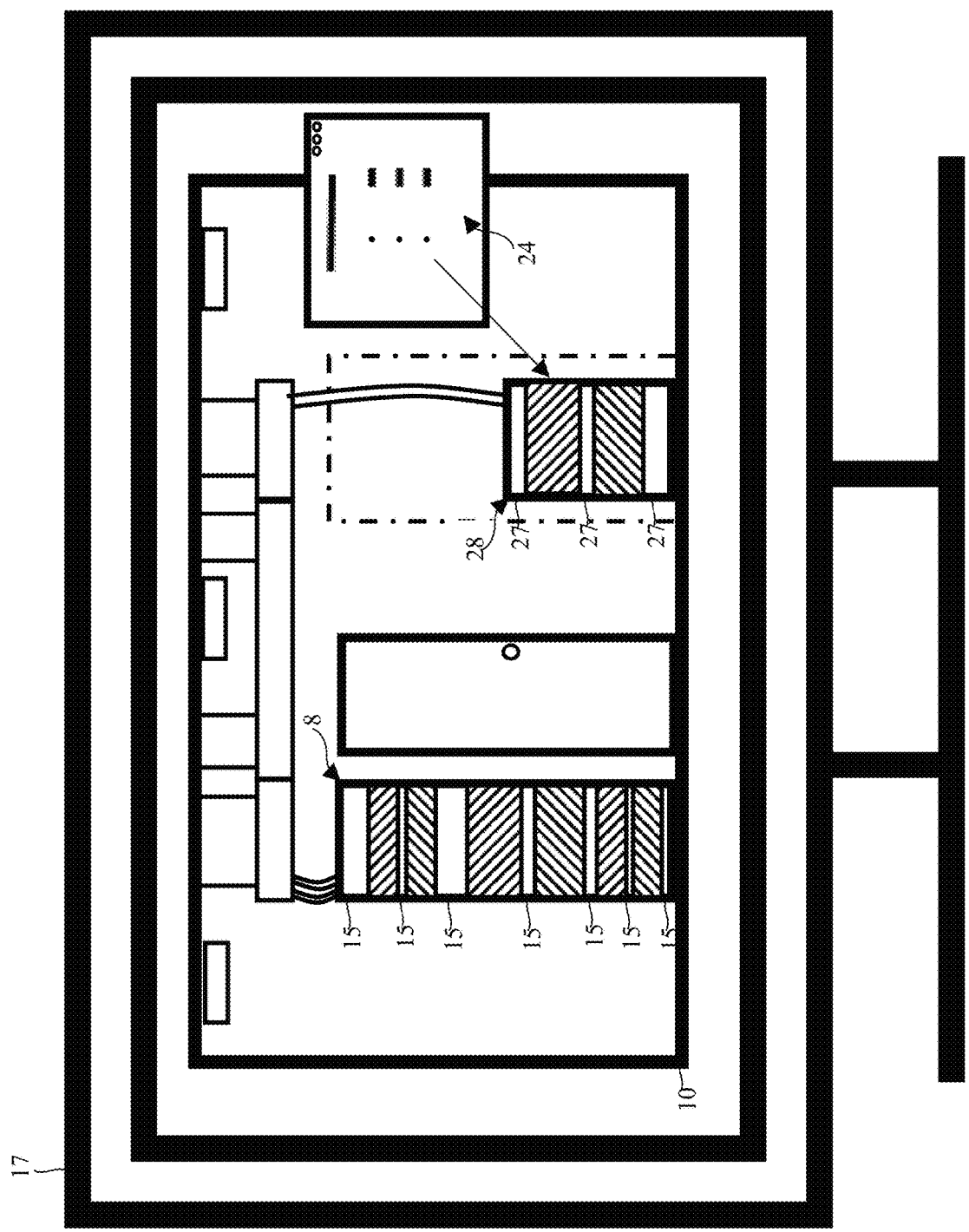
FIG. 10 is a front view of an electronic device with a display screen with a digital copy of a physical facility with new equipment and components being added.
Figure 11:
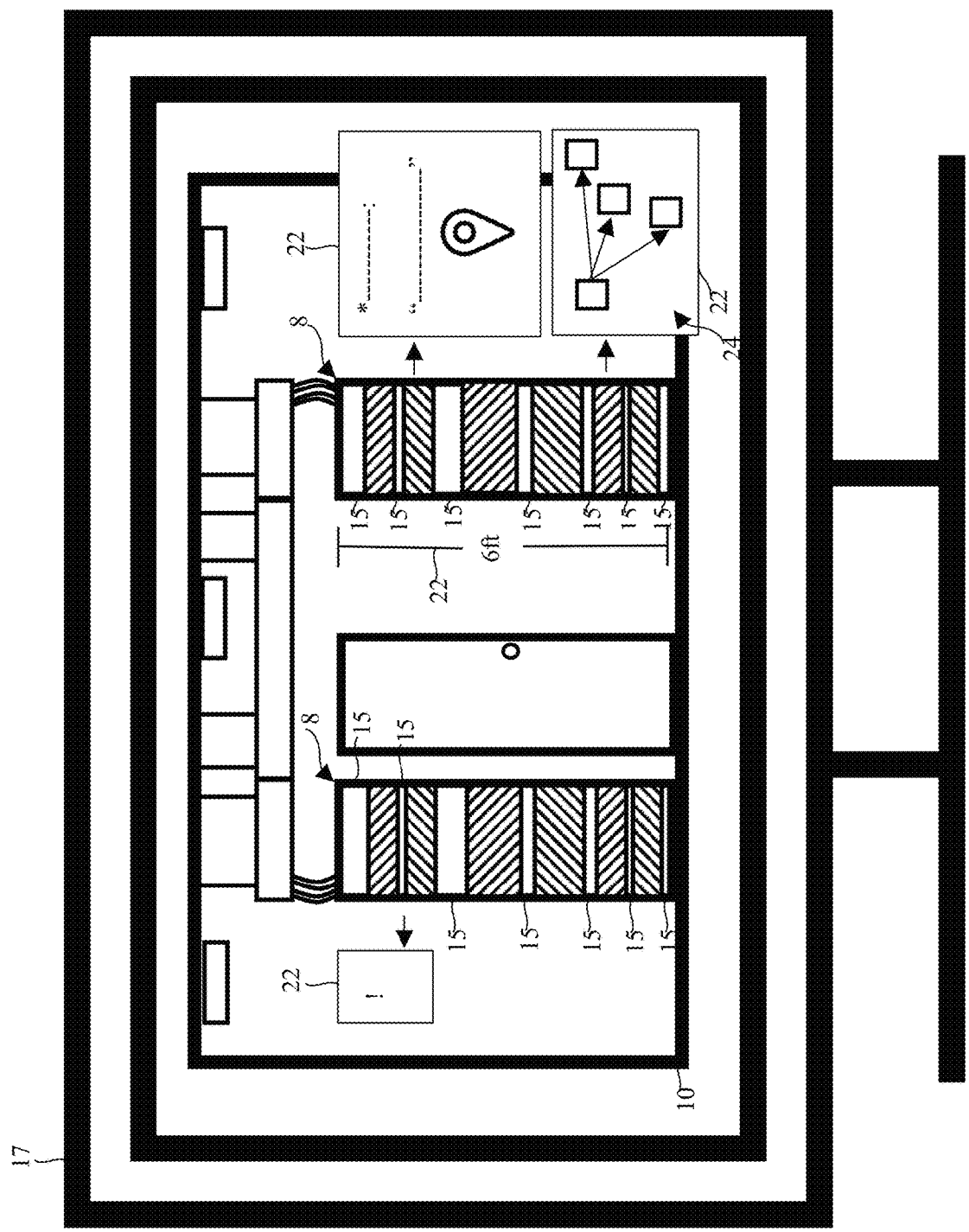
FIG. 11 is a front view of an electronic device with a digital copy of a physical facility being marked up.

It may be desirable to document 22 details within the digital facility 10 to convey information about the physical facility 3 (see FIGS. 6 and 11). As examples, areas of interest may be marked or highlighted, interconnections with other equipment 8 and/or components 15 may be shown or referenced, maintenance manuals related to equipment 8 and/or components 15 within the digital facility 10 may be shown or referenced, facility drawings may be shown or referenced, space reserved for new equipment 23 and/or new components 27 to be installed in the facility 2 may be displayed (see FIG. 10), measurements related to the digital facility 10 or equipment 8 and/or components 15 within the digital facility 10 may be displayed, or notes from other users may be accessible. Other details of the physical facility 3 may be documented 22 in the digital facility 10 and the examples given should not be considered limiting as the only details within the digital facility 10 that can be documented 22. In some implementations, details in the digital facility 10 may be documented 22 as the digital facility 10 is being generated. In some implementations, a user 16 or remote user 11 may document 22 the details of the physical facility 3 prior to performing a walkthrough of the digital facility 10 with other remote users 11. In some implementations, programable logic is used to automatically document 22 the digital facility 10. The programable logic may be the same programable logic used to create the digital facility 10 or it may be separate. The ability to document 22 details of the physical facility 3 in the digital facility 10 allows users 11 and 16 to document and maintain configuration management of the physical facility 3, reduces the burden on the user 16 needing to remember details of the physical facility 3 once they leave the physical facility 3, and eases coordination of equipment 8 and/or component 15 removal or installation.

The ability to document 22 additional details of the physical facility 3 in the digital facility 10 can be called as adding metadata. Adding metadata to a digital facility allows the capability to search information related to the digital facility 10. In some implementations, users 16 and/or remote users 11 have the ability to search the metadata. In some implementations, artificial intelligence can be used to search the metadata. In some implementations, users 16, remote users 11, and/or artificial intelligence can be used to search the metadata. Adding metadata to a digital facility greatly improves the ability to maintain configuration management of the physical facility 3 and associated digital facility 10. In some implementations, permissions can be set for a group of users 16 and remote users 11. Allowing individual permissions for users 16 and remote users 11 or groups of users 16 and remote users 11 allows the visibility of the digital facility 10 or portions of the digital facility 10 to be flexible on a need-to-know basis.

In an alternative implementation, the programable logic 119 and the electronic sensor(s) 9 may detect an element 23 of the equipment 8 and/or components 15 in the physical facility 3 and documentation 22 information related to the element 23 to the user 16 or remote user 11 (see FIG. 2). The element 23 may be, for example, a 2D or 3D image of the equipment 8 and/or component 15 or equipment 8, an RFID, barcode, serial number, or a Quick Response (QR) Code. The information related to the equipment 8 and/or component 15 may be overlaid (e.g., visual) on the equipment 8 and/or component 15 in the digital facility 10 (see FIG. 11) or may have an audio or visual alert to the user notifying them that additional information related to the component is available.

Figure 14:
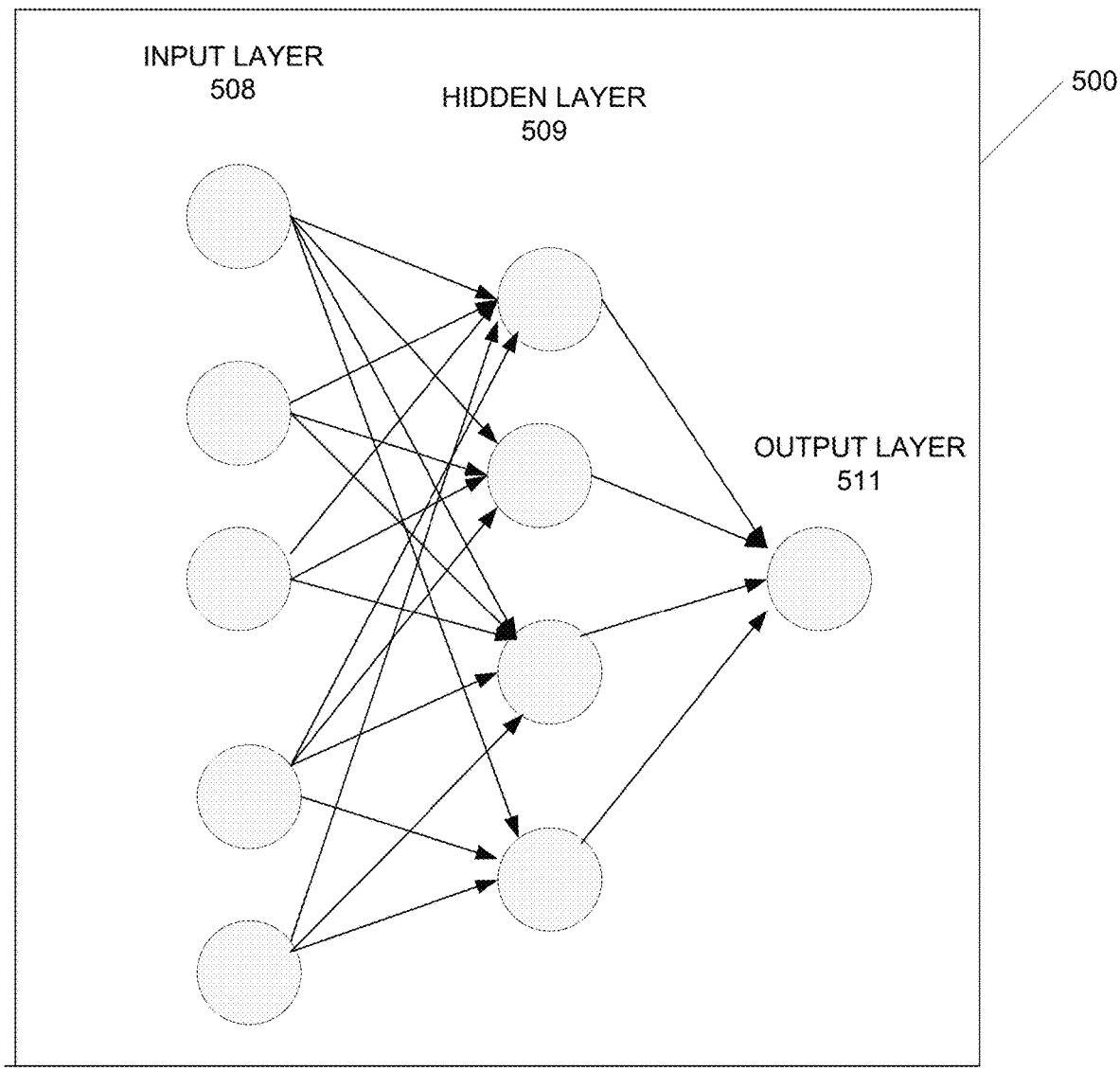
FIG. 14 illustrates a block diagram of computing components and hardware modules used to implement various processes and functions of certain implementations of the present disclosure.

Some aspects of various exemplary constructions are described by referring to and/or using neural network(s) for artificial intelligence (AI) implementation. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Program logic 119 may incorporate various machine intelligence (MI) neutral network 500 (see FIG. 14) features of available Tensorflow (https://www.tensorflow.org) or Neuroph software development platforms (which are incorporated by reference herein). Referring to FIG. 14, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data. In some implementations, the programable logic 119 may contain artificial intelligence (machine learning technology, for example) and may, for example, recognize equipment 8 and/or components 15 in a database 24, recognize new equipment 28 and/or new components 27, recommend data related to the new equipment 28 and/or new components 27 be added to a database 24. The machine learning functionality brings new tangible improved functions to the technology area of automatic AI recommendation.

With continued reference to FIGS. 14 and 15, system 100 and application logic 119 may implement deep learning machine learning techniques implementing a representation of learning methods that allows a machine to be given raw data and determine the representations needed for data classification. By using deployment of deep learning software to implement processing, the computing system 100 may eliminate overhead to process the plethora of raw data that can overwhelm the enterprise and/or reduce processing overhead to improve response time and provide suggestions in the point cloud model. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations, application programmable logic 119, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

One of implementations application programmable logic 119 may include deep learning technology that may utilize a convolutional neural network (CNN) segments data using convolutional filters to locate and identify learned, observable features in the data. Each filter or layer of the convolutional neural network (CNN) architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, such as computer system diagrams, rather than looking for an object, it is more efficient to look for edges which form motifs which form parts, which form the object being sought. These hierarchies of features can be found in many different forms of data such as speech and text, etc. In some implementations, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given Example training dataset.

In some implementations, the programable logic and electronic sensor(s) 9 have the ability to reference both databases 24 on an electronic device 17 that stores the programable logic as well as databases 24 that are on remote electronic devices 17. In some implementations artificial intelligence may automatically find and link interfaces of the equipment 8 and/or components 15 in the digital facility 10. In some implementations, artificial intelligence may highlight suggestions to the user 16 or remote user 11 based on the user's history or profile, highlight suggestions to the user 16 or remote user 11 based on the user's current location 25 in the digital facility 10 or physical facility 3 (FIGS. 3 and 5). The suggestions for example may include when the equipment 8 and/or component 15 was installed, a record of the changes to the settings and configurations of the equipment 8 and/or component 15, what software should be installed on the equipment 8 and/or component 15 to maintain configuration management of the facility 2, how many spare equipment 8 and/or components 15 are in stock, when new software for the equipment 8 and/or component 15 is to be installed, when the equipment 8 and/or component 15 will become obsolete, other compatible equipment 8 and/or components 15, user manuals for the equipment 8 and/or component 15, maintenance handbooks for the equipment 8 and/or component 15, equipment 8 and/or component 15 support videos, equipment 8 and/or component 15 training material, equipment 8 and/or component 15 connection diagrams, facility 2 drawings, common troubleshooting steps, history of equipment 8 and/or component 15 failures, and previous equipment 8 and/or component 15 setting changes.

In some implementations, the element 23 references a database 24 to determine the history of the equipment 8 and/or component 15. The history for example may include when the equipment 8 and/or component 15 was installed, a record of the changes to the settings and configurations of the equipment 8 and/or component 15, what software should be installed on the equipment 8 and/or component 15 to maintain configuration management of the facility 2, how many spare equipment 8 and/or components 15 are in stock, when new software for the equipment 8 and/or component 15 is to be installed, when the equipment 8 and/or component 15 will become obsolete, other compatible equipment 8 and/or components 15, user manuals for the equipment 8 and/or component 15, maintenance handbooks for the equipment 8 and/or component 15, equipment 8 and/or component 15 support videos, equipment 8 and/or component 15 training material, equipment 8 and/or component 15 connection diagrams, facility 2 drawings, common troubleshooting steps, history of equipment 8 and/or component 15 failures, and previous equipment 8 and/or component 15 setting changes (FIG. 3). The ability to determine the history of the individual equipment 8 and/or component 15 within the digital facility 10 enables the ability to maintain the configuration of the of the equipment 8 and/or component(s) 15 that makes up the physical facility 3 and associated digital facility 10 as the physical facility is constantly changing. This is also known as dynamic configuration management. In another preferred implementation, the element 23 references a database to order replacement equipment 8 and/or components 15.

In some implementations, the programable logic 119 may be used to add information to a database 24 captured by the user 16 or remote user 11 or the electronic sensor 9 (FIG. 6 and FIG. 11). This may, for example, be to update the configuration management of the facility 2, when an order for equipment 8 and/or components 15 was placed, document time spent working on the equipment 8 and/or component 15, track equipment 8 and/or component 15 troubleshooting steps, or perform audits of equipment 8 and/or components 15 captured in the facility 2 versus what equipment 8 and/or components 15 should be in the facility 2, document the location of the equipment 8 and/or component 15 (e.g., Geotagging, facility call sign, etc.), or audio and visual data related to the equipment 8 and/or components 15. In some implementations, the programable logic can read and write to one or more databases 24. In some implementations, the programable logic can generate new databases 24. In some implementations, the programable logic may be able to search, filter and/or compare entries in the database 24. In some implementations, the programmable logic may be able to search, filter, and/or compare entries in the database 24 to what is being captured with the electronic sensor(s) 9. The ability to search a database(s) associated with a digital facility 10 greatly improves the ability to maintain the configuration management of the physical facility 3 and the associated digital facility 10. Various information related to the equipment 8 and/or component 15 may be documented 22 in a database 24 and the examples provided of items that may be documented 22 in a database 24 should not be considered limiting in scope. The database 24 may be integrated with the electronic sensor(s) 9 and programable logic or may be stored on a separate electronic devise 17.

The ability to document 22 information in the digital facility 10 allows users 16 or remote users 11 to perform audits, troubleshoot equipment 8 and/or components 15, provide technical support for equipment 8 and/or components 15, provide training materials for equipment 8 and/or components 15, and manage version control of equipment 8 and/or components 15 within the facility 2.

In some implementations, the programable logic 119 may automatically fill out forms related to the equipment 8 and/or component 15 seen with the electronic sensor(s) 9. The ability to automatically fill out forms related to the equipment 8 and/or components 15, for example, allows the user 16 or remote user 11 to quickly order equipment 8 and/or components 15, document changes that they have made to the equipment 8 and/or component 15, document troubleshooting steps that the users 16 or 11 has taken to resolve issues with the equipment 8 and/or component 15, and document 22 the current status of the equipment 8 and/or component 15.

In some implementations, the programable logic 119 responds to audio, hand, or eye commands from the user 16 (see FIG. 3) or remote user 11. Having the programmable logic 119 respond to users 11 and/or 16 input that is hands free allows the users 11 and/or 16 to use their hands to perform other tasks with their hands while interacting with the digital facility 10 or information related to the digital facility 10.

Figure 7:
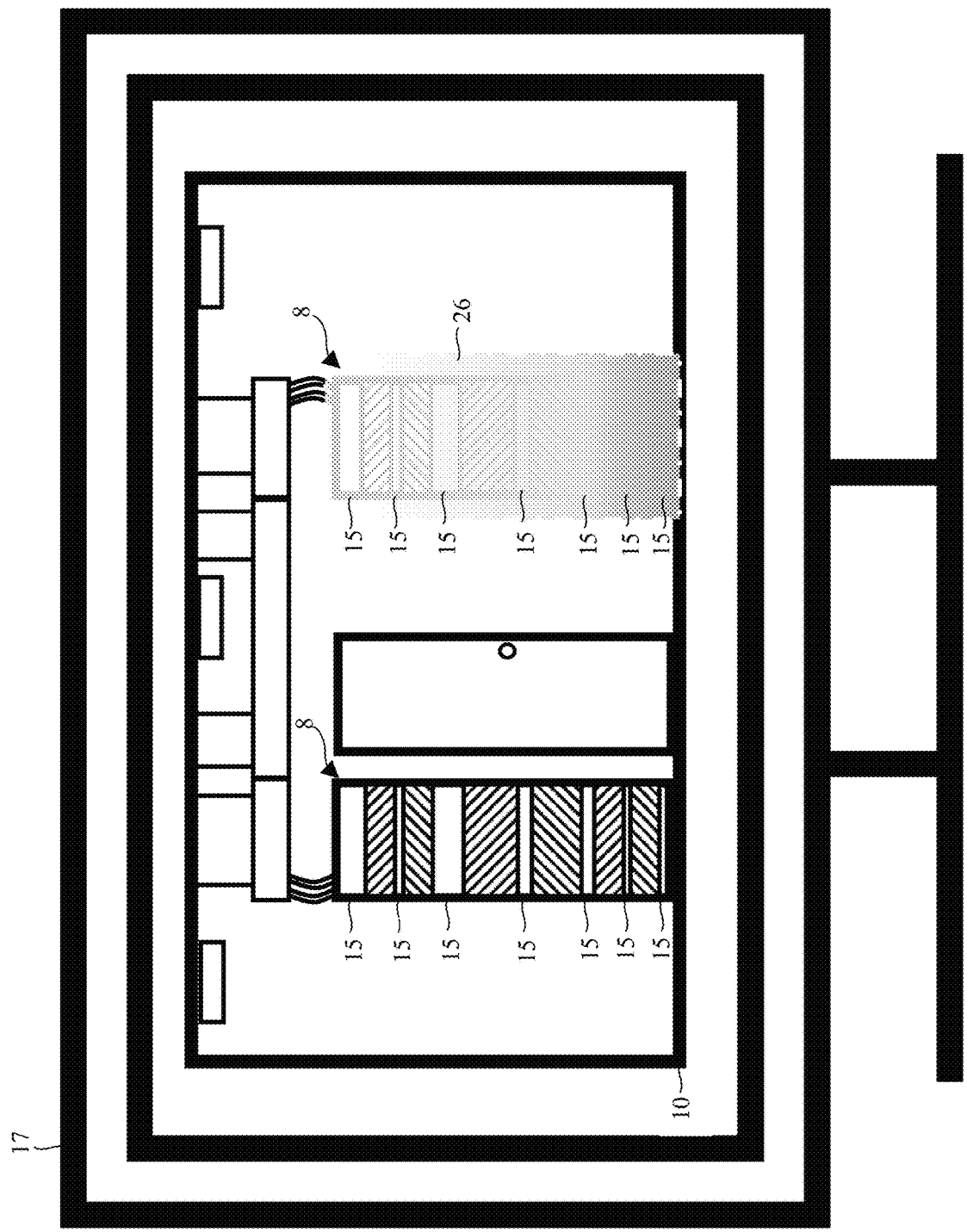
FIG. 7 is a front view of an electronic device with a digital copy of a physical facility with sensitive information being removed.

At times it may be desirable to add equipment 8 and/or components 15 not currently in the physical facility 3 to the digital facility 10. This may be to add detail regarding future plans for the facility 2 or to highlight historical data of equipment 8 and/or components 15 that used to be in the facility 2. As examples, the user may add new equipment 8 and/or components 15 (FIG. 10). Other times it may be desirable to remove unwanted equipment 8 and/or components 15 in the digital facility 10. This may, for example, be due to users 16 or equipment 8 and/or components 15 that are in the digital facility 10 that need to be removed or to remove sensitive information. In some implementations, users 16 or remote users 11 can blur 26 data within the digital facility 10 (see FIG. 7).

Figure 8:
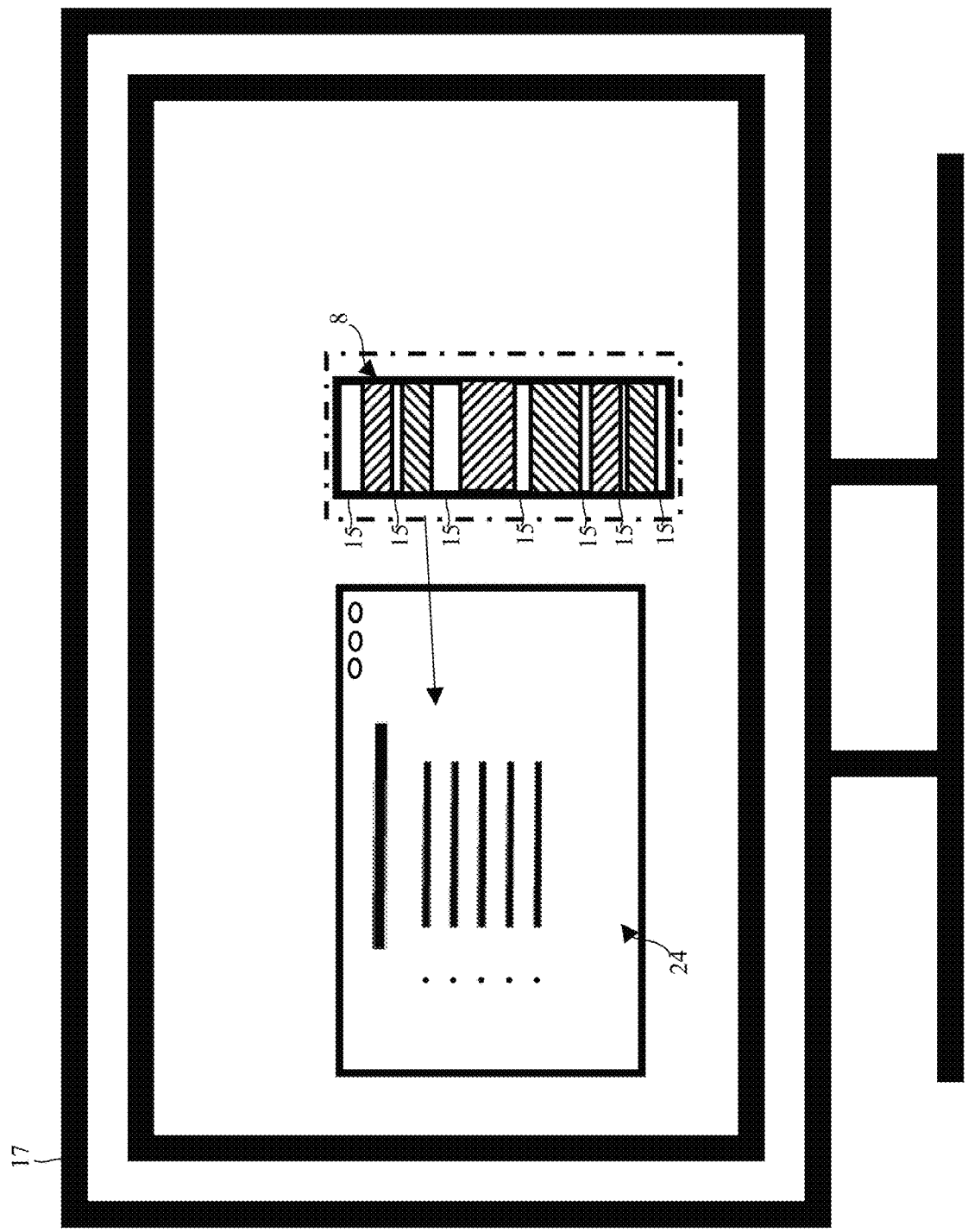
FIG. 8 is a front view of an electronic device with a digital copy of equipment and components from a physical facility being added to a database.
Figure 9:
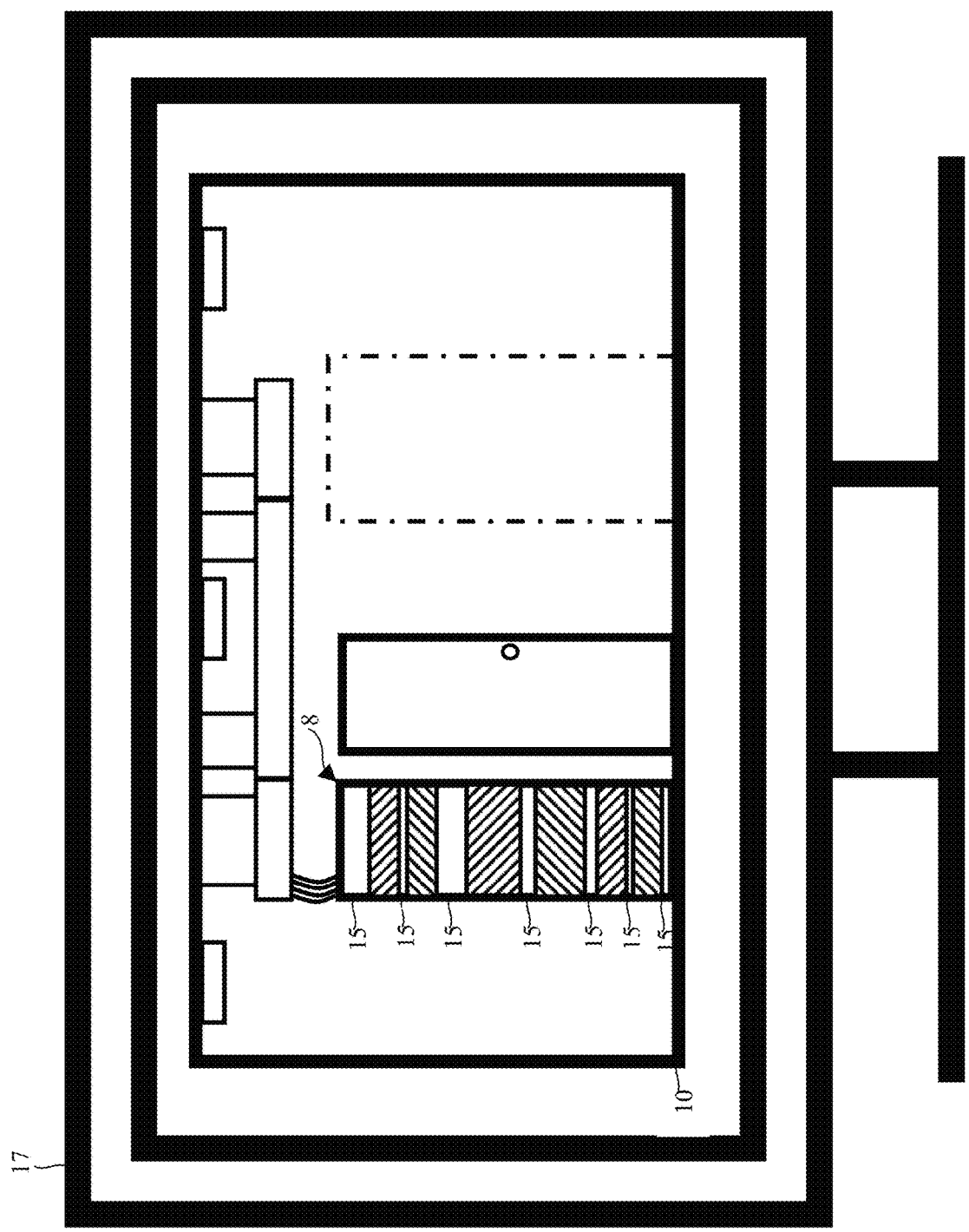
FIG. 9 is a front view of an electronic device with a digital copy of a physical facility with equipment and components being removed.

In some implementations, users 16 or remote users 11 can add equipment 8 and/or components 15 to the digital facility (FIG. 10). In some implementations, users 16 or remote users 11 can remove equipment 8 and/or components 15 from the digital facility 10 (FIG. 9). In some implementations, users 16 or remote users 11 can add or remove equipment 8 and/or components 15 from the digital facility 10. The ability to add and remove equipment 8 and components 15 from the digital facility 10 allows users 16 and remote users 11 to maintain configuration management of the physical facility 3. The ability to add and remove equipment 8 and components 15 also allows users 16 and remote users 11 to mockup the digital facility 10 to document 22 what the physical facility 3 may look like when physical alterations are made. In some implementations, equipment 8 and/or components 15 that are added or removed from the digital facility 10 can be added to a database 24 of equipment 8 and/or components 15 that can be added to other digital facilities 10 (FIG. 8).

A digital facility 10 that can be accessed and manipulated by a remote user 11 not at the physical facility 3 allows equipment subject matter experts not located at the physical facility 3 to provide remote support to people at the physical facility 3 saving time and money by removing unnecessary travel to the physical facility 3. Remote users 11 are able to see the equipment 8 and/or components 15 in the digital facility 10 that the person is in the physical facility 3 is located. As examples, the remote user 11 can provide remote maintenance support of equipment 8 and/or components 15 in the physical facility 3, provide training or familiarization of equipment 8 and/or components 15 within the physical facility 3, can determine interconnections and potential trouble spots, and provide visual audits of equipment 8 and/or components 15 within the digital facility 10.

Figure 16:
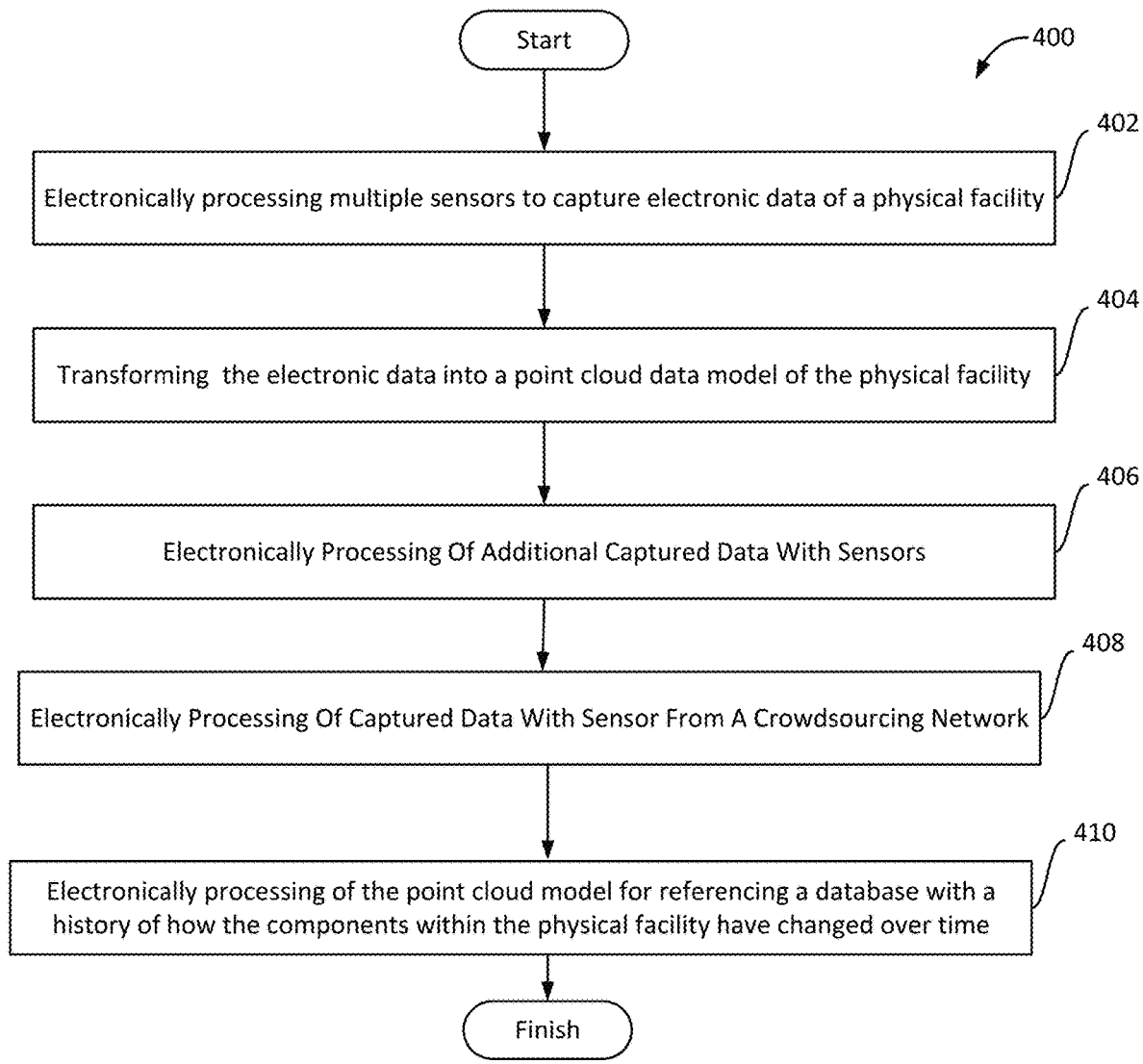
FIG. 16 illustrates one or more computer implemented method(s) in accordance with one or more implementations of the present disclosure.
Figure 17:
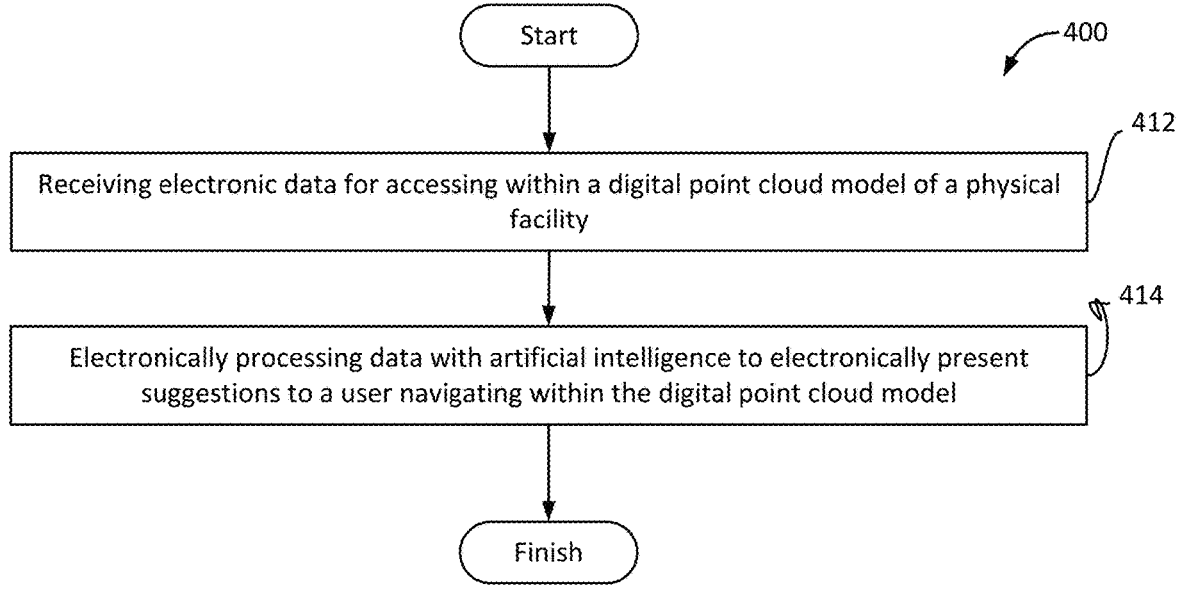
FIG. 17 illustrates one or more computer implemented method(s) in accordance with one or more implementations of the present disclosure.
Figure 18:
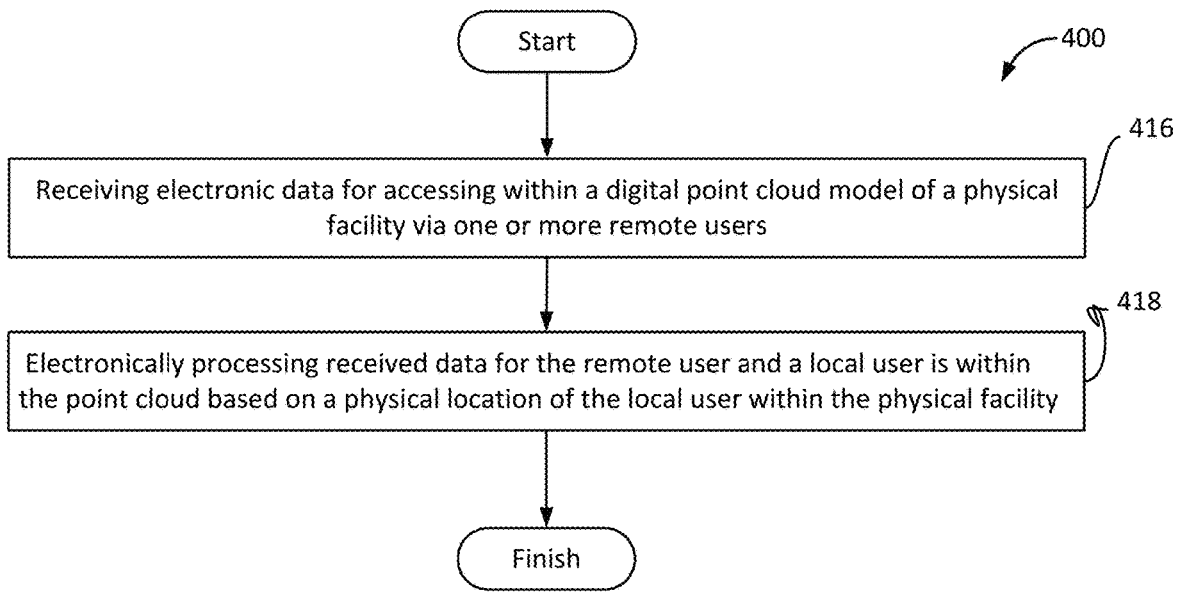
FIG. 18 illustrates one ore more computer implemented method(s) in accordance with one or more implementations of the present disclosure.

FIGS. 16-18 illustrates a method 400 for method for creating, storing, interacting, and/or manipulating a digital facility, in accordance with one or more implementations of the present disclosure. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 16-18 and described below is not intended to be limiting.

In some implementations, method 400 may be implemented in one or more processing devices 103 (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on a non-transitory electronic storage medium 121. The one or more processing devices may include one or more devices configured through hardware, firmware, and/or software to be specifically designed for execution of one or more of the operations of method 400.

FIGS. 16-18 illustrates method 400, in accordance with one or more implementations. An operation 402 may include electronically processing using multiple sensors 9 to capture electronic data of a physical facility. Operation 402 may be performed by one or more hardware processors configured by machine-readable instructions including modules of application programmable logic 119, in accordance with one or more implementations.

An operation 404 may include electronically processing using programable logic 119 to transform the electronic data into a point cloud computerized model of the physical facility. Operation 404 may be performed by one or more hardware processors configured by machine-readable instructions including one or more modules of application programmable logic 119, in accordance with one or more implementations.

An operation 406 may include electronically processing and documenting additional machine readable data of the physical facility within the point cloud computerized model. Operation 406 may be performed by one or more hardware processors configured by machine-readable instructions including one or more modules of application programmable logic 119, in accordance with one or more implementations. An operation 408 may include electronically processing using programable logic 119 to capture electronic data into a point cloud computerized model of the physical facility via a crowdsourcing network. Operation 408 may include optionally electronic data received from multiple users platforms in which the multiple user platforms capture electronic data of a portion of a physical facility and the programable logic 119 is configured to transform the electronic data from the multiple users into the computerized model of the physical facility. Operation 408 may be performed by one or more hardware processors configured by machine-readable instructions including one or more modules of application programmable logic 119, in accordance with one or more implementations.

An operation 410 may include electronically processing using programable logic 119 to capture electronic data into a point cloud computerized model of the physical facility and references a computer readable database with a history of how the scanned components within the physical facility have changed over time. Operation 410 may be performed by one or more hardware processors configured by machine-readable instructions including one or more modules of application programmable logic 119, in accordance with one or more implementations.

An operation 412 may include electronically processing using programable logic 119 to receive data interacting for within a digital point cloud model of a physical facility. Operation 412 may be performed by one or more hardware processors configured by machine-readable instructions including a module of application programmable logic 119, in accordance with one or more implementations.

An operation 414 may include electronically processing using programable logic 119 with artificial intelligence 500 to provide suggestions to a user navigating within the digital point cloud model. Operation 414 may be performed by one or more hardware processors configured by machine-readable instructions including a module of application programmable logic 119, in accordance with one or more implementations.

An operation 416 may include electronically processing using programable logic 119 to receive data interacting for within a digital point cloud model of a physical facility in which a remote user may access a computer network to navigate within the point cloud model while a local user within the physical facility accesses the computer network to navigate within the point cloud model. Operation 416 may be performed by one or more hardware processors configured by machine-readable instructions including a module of application programmable logic 119, in accordance with one or more implementations.

An operation 418 may include electronically processing using programable logic 119 to receive digital data for the remote user and the local user is within the point cloud based on a physical location of the local user within the physical facility. Operation 418 may be performed by one or more hardware processors configured by machine-readable instructions including a module of application programmable logic 119, in accordance with one or more implementations.

FIG. 12 illustrates a block diagram of a specific programmed computing device/platform 101 (e.g., a computer server or cloud computing environment) that may be used according to an illustrative implementation of the present disclosure. The computer server 101 may have a processor 103 for controlling overall operation of the server and its associated components, including RAM 105, ROM 107, input/output module 109, and memory 115.

Processor(s) 103 may be configured to provide information processing capabilities in computing platform(s) 101. As such, processor(s) 103 may include one or more of a digital processor, an analog processor, a digital circuit designed to process information, an analog circuit designed to process information, a state machine, and/or other mechanisms for electronically processing information. Although processor(s) 103 is shown in FIG. 12 as a single entity, this is for illustrative purposes only. In some implementations, processor(s) 103 may include a plurality of processing units. These processing units may be physically located within the same device, or processor(s) 103 may represent processing functionality of a plurality of devices operating in coordination. Processor(s) 103 may be configured to execute modules in programmed logic 119, and/or other modules.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output, augmented reality display glasses, tactile feedback, brail reader, mobile device, laser scanner, and/or radar. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121 with machine readable instructions. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 12 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed. The network connections may be provided according to any desired encoding and modulating scheme, including Bluetooth, ZIGBEE, Z-Wave, cellular, radio frequency, WIFI, near field communications (NFC) and the like.

Computing device 101 and/or terminals 141 or 151 may also be mobile terminals including various other components, such as a battery, speaker, and antennas (not shown).

The disclosure is operational with numerous other special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, cloud-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

Figure 13:
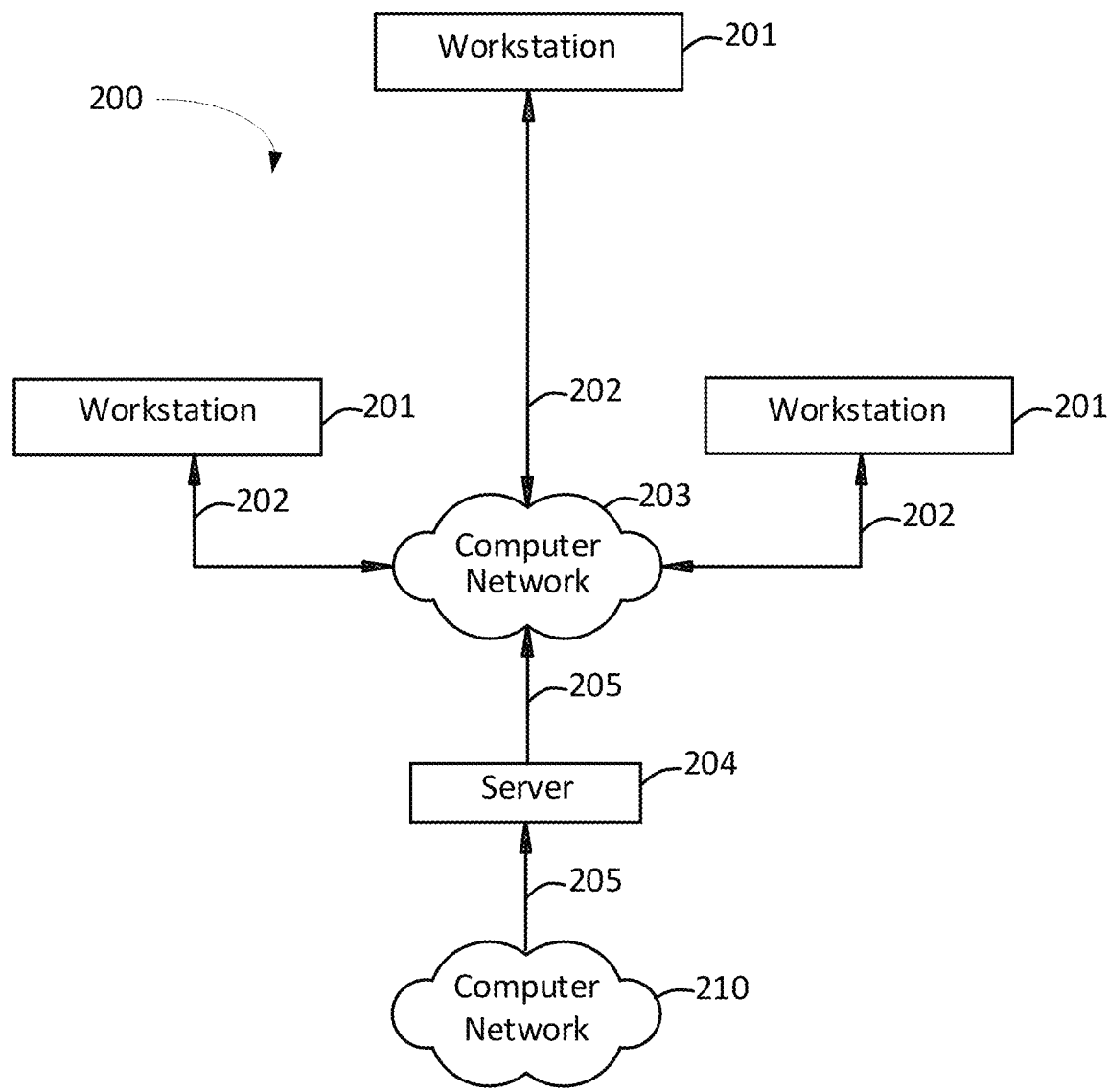
FIG. 13 is an illustrative block diagram of workstations and servers that may be used to implement the processes and functions of certain implementations of the present disclosure.

Referring to FIG. 13, an illustrative system 200 for implementing methods according to the present disclosure is shown. As illustrated, system 200 may include one or more mobile workstations 201. Mobile workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), 5G, or any combination of any of the same. Communications links 202 and 205 may be any communications links suitable for communicating between workstations 201 and server 204, such as network links, dial-up links, wireless links, hard-wired links, etc. While illustrative systems and methods as described herein embodying various aspects of the present disclosure are shown, it will be understood by those skilled in the art, that the disclosure is not limited to these implementations. Modifications may be made by those skilled in the art, particularly in light of the foregoing teachings. For example, each of the elements of the aforementioned implementations may be utilized alone or in combination or sub-combination with elements of the other implementations. It will also be appreciated and understood that modifications may be made without departing from the true spirit and scope of the present disclosure. The description is thus to be regarded as illustrative instead of restrictive on the present disclosure.

The invention claimed is:

1. A system configured for data communication, the system comprising:
    one or more hardware processors configured by machine-readable instructions to:
    electronically receive a plurality of machine-readable sensor data of a physical facility having multiple 3D objects;
    electronically process the plurality of machine-readable sensor data to output a machine-readable point cloud model including physical based renders of said 3D objects, the point cloud model configured for augmented virtual navigation by a remote user platform in a virtual navigation space logically linked to the point cloud model;
    electronically process machine-readable point cloud model to generate a machine-readable dynamic configuration database of geotagged-locations of the 3D objects with a set of virtual space reservation metadata logically annotated to the 3D objects; and
    electronically output data to the remote user platform, including at least one of the 3D objects with associated at least one of said virtual space reservation metadata linked to the at least one of the 3D objects in the virtual navigation space.

2. The system of claim 1, wherein the one or more hardware processors are further configured by machine-readable instructions to electronically process the point cloud model with a neural network to output a set of most probable suggestions for augmented virtual navigation.

3. The system of claim 1, wherein the one or more hardware processors are further configured by machine-readable instructions to electronically receive the plurality of machine-readable sensor data from multiple remote sensors.

4. The system of claim 1, wherein the one or more hardware processors are further configured by machine-readable instructions to electronically receive the plurality of machine-readable sensor data from a crowdsourcing network.

5. The system of claim 1, wherein the one or more hardware processors are further configured by machine-readable instructions to electronically process the configuration database to recognize historical change data over to a predetermined period of time of the 3D objects.

6. The system of claim 1, wherein the one or more hardware processors are further configured by machine-readable instructions to electronically process the configuration database to recognize historical maintenance data over to a predetermined period of time of the 3D objects.

7. The system of claim 1, wherein the one or more hardware processors are further configured by machine-readable instructions to electronically receive the plurality of machine-readable sensor data from a group of selected from one of a RFID, barcode, a serial number, a quick response code associated with the 3D objects.

8. The system of claim 1, wherein the one or more hardware processors are further configured by machine-readable instructions to process the machine-readable point cloud model to provide physically based rendering of the 3D objects.

9. The system of claim 1, wherein the one or more hardware processors are further configured by machine-readable instructions to process the machine-readable point cloud model wherein multiple remote user platforms are configured for augmented virtual navigation within the point cloud model.

10. The system of claim 1, wherein the one or more hardware processors are further configured by machine-readable instructions to process the machine-readable point cloud model wherein multiple remote user platforms are configured for simultaneous augmented virtual navigation within the point cloud model.

11. A system configured for data communication, the system comprising:
one or more hardware processors configured by machine-readable instructions to:
electronically receive a plurality of machine-readable sensor data of a physical facility having multiple 3D objects;
electronically process the plurality of machine-readable sensor data to output a machine-readable point cloud model including physical based renders of said 3D objects, the point cloud model configured for augmented virtual navigation by a remote user in a virtual navigation space logically linked to said point cloud model;
electronically process the point cloud model with a neural network to output a set of probable suggestions for augmented virtual navigation of the point cloud model by the remote user with a set of virtual space reservation metadata electronically annotated to the 3D objects; and
electronically output data to the remote user including at least one of the 3D objects with associated at least one of said virtual space reservation metadata electronically linked to the at least one of the 3D objects in the virtual navigation space.

12. The system of claim 11, wherein the one or more hardware processors are further configured by machine-readable instructions to electronically process machine-readable point cloud model to generate a machine-readable configuration database of geotagged-location of the 3D objects.

13. The system of claim 12, wherein the one or more hardware processors are further configured by machine-readable instructions to electronically process the configuration database to recognize historical change data over to a predetermined period of time of the 3D objects.

14. The system of claim 12, wherein the one or more hardware processors are further configured by machine-readable instructions to electronically process the configuration database to recognize historical maintenance data over to a predetermined period of time of the 3D objects.

15. The system of claim 11, wherein the one or more hardware processors are further configured by machine-readable instructions to electronically receive the plurality of machine-readable sensor data from multiple remote sensors.

16. The system of claim 11, wherein the one or more hardware processors are further configured by machine-readable instructions to electronically receive the plurality of machine-readable sensor data from a crowdsourcing network.

17. The system of claim 11, wherein the one or more hardware processors are further configured by machine-readable instructions to store a database of a machine-readable history data of the remote user associated with the point cloud model augmented virtual navigation and processing the machine readable history data with the neural network to output the set of probable suggestions.

18. The system of claim 11, wherein the one or more hardware processors are further configured by machine-readable instructions to process the machine-readable point cloud model to provide physically based rendering of the 3D objects for texturing.

19. A system configured for data communication, the system comprising:
one or more hardware processors configured by machine-readable instructions to:
electronically receive a machine-readable point cloud model generated from a plurality of machine-readable sensor data of a physical facility having multiple 3D objects;
the machine-readable point cloud model including physical based renders of said 3D objects, the point cloud model being configured for augmented virtual navigation by a remote user platform in a virtual navigation space logically linked to said point cloud model; and
electronically process the machine-readable point cloud model to generate a machine-readable dynamic configuration database of geotagged-locations of the 3D objects with virtual space reservation maintenance metadata electronically annotated to the 3D objects; and
electronically output data to the remote user platform including at least one of the 3D objects with associated at least one of said virtual space reservation metadata linked to the at least one of the 3D objects in the virtual navigation space.

20. The system of claim 19, wherein the one or more hardware processors are further configured by machine-readable instructions to process the machine-readable point cloud model wherein multiple remote users can access the point cloud model simultaneously.

* * * * *